(12) United States Patent
Park

(10) Patent No.: US 7,190,419 B2
(45) Date of Patent: Mar. 13, 2007

(54) LIQUID CRYSTAL DISPLAY DEVICE AND METHOD OF FABRICATING THE SAME

(75) Inventor: Seung-Ryull Park, Gyeonggi-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 330 days.

(21) Appl. No.: 10/963,590

(22) Filed: Oct. 14, 2004

(65) Prior Publication Data

US 2005/0122442 A1    Jun. 9, 2005

(30) Foreign Application Priority Data

Dec. 3, 2003    (KR) ...................... 10-2003-0087046

(51) Int. Cl.
*G02F 1/136*    (2006.01)
*G02F 1/1335*    (2006.01)
*G02F 1/1343*    (2006.01)

(52) U.S. Cl. .................... 349/43; 349/44; 349/106; 349/141

(58) Field of Classification Search .............. 349/43, 349/44, 106, 141
See application file for complete search history.

(56) References Cited

U.S. PATENT DOCUMENTS

| | | | | |
|---|---|---|---|---|
| 6,162,654 A * | 12/2000 | Kawabe | ...................... | 438/30 |
| 6,429,916 B1 * | 8/2002 | Nakata et al. | ............... | 349/106 |
| 6,693,697 B2 * | 2/2004 | Sakamoto et al. | .......... | 349/138 |
| 6,768,531 B2 * | 7/2004 | Ochiai et al. | ............... | 349/141 |
| 6,873,382 B2 * | 3/2005 | Chang et al. | ............... | 349/106 |

FOREIGN PATENT DOCUMENTS

| | | |
|---|---|---|
| JP | 2000-111957 | 4/2000 |
| KR | 1020020069168 | 8/2002 |
| KR | 10-2003-0014132 | 2/2003 |

OTHER PUBLICATIONS

Copy of Communication from Korean Patent Office.

* cited by examiner

*Primary Examiner*—Mike Qi
(74) *Attorney, Agent, or Firm*—McKenna Long & Aldridge LLP

(57) ABSTRACT

A liquid crystal display device includes: first and second substrates facing and spaced apart from each other; a gate line on an inner surface of the first substrate; a data line crossing the gate line to define a pixel region; a thin film transistor connected to the gate line and the data line; a black matrix over the thin film transistor, the black matrix having an open portion corresponding to the pixel region and including a light shielding resin; a connection electrode over the black matrix, the connection electrode being connected to the thin film transistor; a color filter layer on the connection electrode, the color filter layer corresponding to the open portion; a plurality of pixel electrodes on the color filter layer, the plurality of pixel electrodes being connected to the connection electrode; a plurality of common electrodes on the color filter layer, the plurality of common electrodes being connected to a common line and alternating with the plurality of pixel electrodes; and a liquid crystal layer between the first and second substrates.

44 Claims, 36 Drawing Sheets

US 7,190,419 B2

LIQUID CRYSTAL DISPLAY DEVICE AND METHOD OF FABRICATING THE SAME

This application claims the benefit of Korean Patent Application No. 2003-0087046, filed on Dec. 3, 2003, which is hereby incorporated by reference.

BACKGROUND OF THE INVENTION

1. Field of the Invention

The present invention relates to a liquid crystal display device. More particularly, it relates to a color filter on thin film transistor (COT) type in-plane switching (IPS) mode liquid crystal display (LCD) device and a method of fabricating the same.

2. Discussion of the Related Art

Liquid crystal display (LCD) devices are being developed as the next generation of display devices because of their characteristics of light weight, thin profile, and low power consumption. In general, an LCD device is a non-emissive display device that displays images by making use of a refractive index difference through utilizing optical anisotropic properties of liquid crystal molecules interposed between an array substrate and a color filter substrate. When an electric field is applied to liquid crystal molecules, the liquid crystal molecules are reoriented. As a result, light transmittance of the liquid crystal molecules is changed according to an alignment direction of the reoriented liquid crystal molecules.

The LCD device includes two substrates disposed to have their respective electrodes face each other, and a liquid crystal layer is formed between the respective electrodes. When a voltage is applied to the electrodes, an electric field is generated between the electrodes to modulate light transmittance of the liquid crystal layer by reorienting liquid crystal molecules, thereby displaying images.

FIG. 1 is an exploded perspective view of a liquid crystal display device according to the related art. In FIG. 1, a liquid crystal display (LCD) device 11 includes an upper substrate 5, a lower substrate 22 and a liquid crystal layer 14 interposed between the upper and lower substrates 5 and 22. A black matrix 6 is formed on the upper substrate 5 and a color filter layer 8 including sub-color filters is formed on the black matrix 6. A common electrode 18 is formed on the color filter layer 8. A pixel electrode 17 and a thin film transistor (TFT) "T" as a switching element are formed on the lower substrate 22 in a pixel region "P." The pixel electrode 17 is formed of a transparent conductive material, such as indium-tin-oxide (ITO) and indium-zinc-oxide (IZO). The pixel region "P" is defined by a gate line 13 and a data line 15. The TFT "T" is connected to the gate line 13 and the data line 15. In addition, a storage capacitor "$C_{ST}$", which is connected in parallel with the pixel electrode 17, is formed on the gate line 13. A portion of the gate line 13 is used as a first electrode of the storage capacitor "$C_{ST}$" and a metal pattern 30 having an island shape, which is in the same layer and is formed of the same material as the source and drain electrodes of the TFT "T," is used as a second electrode of the storage capacitor "$C_{ST}$." Since the metal pattern 30 is connected to the pixel electrode 17, the same signal that is applied to the metal pattern 30 is also applied to the pixel electrode 17.

The upper substrate 5 and the lower substrate 22 can be referred to as a color filter substrate and an array substrate, respectively. Since the LCD device 11 is obtained by attaching the upper substrate 5 having the color filter layer 8 and the lower substrate 22 having array elements, such as the gate line 13, the data line 15 and the TFT "T," the performance of the LCD device 11 may deteriorate due to light leakage resulting from an alignment error.

FIG. 2 is a schematic cross-sectional view taken along a line "II—II" of FIG. 1. In FIG. 2, an upper substrate 5 and a lower substrate 22 are spaced apart from each other, and a liquid crystal layer 14 is interposed between the upper substrate 5 and the lower substrate 22. A thin film transistor (TFT) "T" including a gate electrode 32, an active layer 34, a source electrode 36 and a drain electrode 38 is formed on the lower substrate 22 and a passivation layer 40 is formed on the TFT "T." A pixel electrode 17 connected to the drain electrode 38 of the TFT "T" is formed in a pixel region "P" defined by a gate line 13 and a data line 15. A storage capacitor "$C_{ST}$" that is connected in parallel to the pixel electrode 17 is formed over the gate line 13.

A black matrix 6 corresponding to the gate line 13, the data line 15 and the TFT "T" is formed on the upper substrate 5. A color filter layer 8 is formed on the black matrix 6 to correspond to the pixel region "P." The data line 15 is separated by a first distance "IIIa" from the pixel electrode 17 to prevent vertical cross talk. In addition, the gate line 13 is also separated from the pixel electrode 17 by a second distance "IIIb." Since light leaks through a first gap between the data line 15 and the pixel electrode 17 and a second gap between the gate line 13 and the pixel electrode 17, the black matrix 6 of the upper substrate 5 covers the first and second gaps. Moreover, the black matrix 6 covers the TFT "T" to prevent incidence of light onto the active layer 34 through the passivation layer 40.

Since a misalignment may occur during an attachment process of the upper and lower substrates 5 and 22, the black matrix 6 is designed with a misalignment margin. Accordingly, aperture ratio is reduced due the misalignment margin that is included in the black matrix. Moreover, since a misalignment exceeding the misalignment margin causes a light leakage at the first and second gaps, display quality deteriorates.

SUMMARY OF THE INVENTION

Accordingly, the present invention is directed to a liquid crystal display device and method of fabricating the same that substantially obviate one or more of the problems due to limitations and disadvantages of the related art.

An object of the present invention is to provide a liquid crystal display (LCD) device having a high aperture ratio and a method of fabricating the LCD device.

Another object of the present invention is to provide an LCD device having a high viewing angle and a method of fabricating the LCD device.

Another object of the present invention is to provide an LCD device where a corrosion of a pad is prevented and a corresponding method of fabricating the LCD device.

Additional features and advantages of the invention will be set forth in the description which follows and in part will be apparent from the description, or may be learned by practice of the invention. These objectives and other advantages of the invention will be realized and attained by the structure particularly pointed out in the written description and claims hereof as well as the appended drawings.

To achieve these and other advantages, an embodiment in accordance with the principles of the present invention provides a liquid crystal display device including: first and second substrates facing and spaced apart from each other; a gate line on an inner surface of the first substrate; a data line crossing the gate line to define a pixel region; a thin film transistor connected to the gate line and the data line; a black matrix over the thin film transistor, the black matrix having an open portion corresponding to the pixel region and including a light shielding resin; a connection electrode over the black matrix, the connection electrode being connected to the thin film transistor; a color filter layer on the connection electrode, the color filter layer corresponding to the open portion; a plurality of pixel electrodes on the color filter layer, the plurality of pixel electrodes being connected to the connection electrode; a plurality of common electrodes on the color filter layer, the plurality of common electrodes being connected to a common line and alternating with the plurality of pixel electrodes; and a liquid crystal layer between the first and second substrates.

In another aspect, a method of fabricating liquid crystal display device includes: forming a gate line and a gate pad at one end of the gate line on a first substrate; forming a data line crossing the gate line to define a pixel region and a data pad at one end of the data line; forming a thin film transistor connected to the gate line and the data line; forming a black matrix over the thin film transistor, the black matrix having an open portion corresponding to the pixel region and including a light shielding resin; forming a connection electrode over the black matrix, an auxiliary gate pad terminal contacting the gate pad, the connection electrode being connected to the thin film transistor; forming a color filter layer on the connection electrode, the color filter layer corresponding to the open portion; forming a pixel connection line connected to the connection electrode, a plurality of pixel electrodes extending from the pixel connection line, a common connection line connected to the common line and a plurality of common electrodes extending from a common connection line on the color filter layer, the plurality of common electrodes alternating with the plurality of pixel electrodes; and forming a liquid crystal layer between the first and second substrates.

In another aspect, a liquid crystal display device includes: first and second substrates facing and spaced apart from each other; a gate line on an inner surface of the first substrate; a data line crossing the gate line to define a pixel region; a thin film transistor connected to the gate line and the data line; a black matrix covering the gate line, the data line and the thin film transistor, the black matrix including an opaque resin; a connection electrode over the black matrix, the connection electrode being connected to the thin film transistor; a common line overlapping the gate line; a color filter layer on the connection electrode, the color filter layer corresponding to the pixel region; a plurality of pixel electrodes on the color filter layer, the plurality of pixel electrodes being connected to the connection electrode; a plurality of common electrodes on the color filter layer, the plurality of common electrodes being connected to the common line and alternating with the plurality of pixel electrodes; and a liquid crystal layer between the first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the present invention and together with the description serve to explain the principles of the invention.

DETAILED DESCRIPTION OF THE PREFERRED EMBODIMENTS

Reference will now be made in detail to preferred embodiments of the present invention, examples of which are shown in the accompanying drawings. Wherever possible, similar reference numbers will be used throughout the drawings to refer to the same or similar parts.

Figure 1:
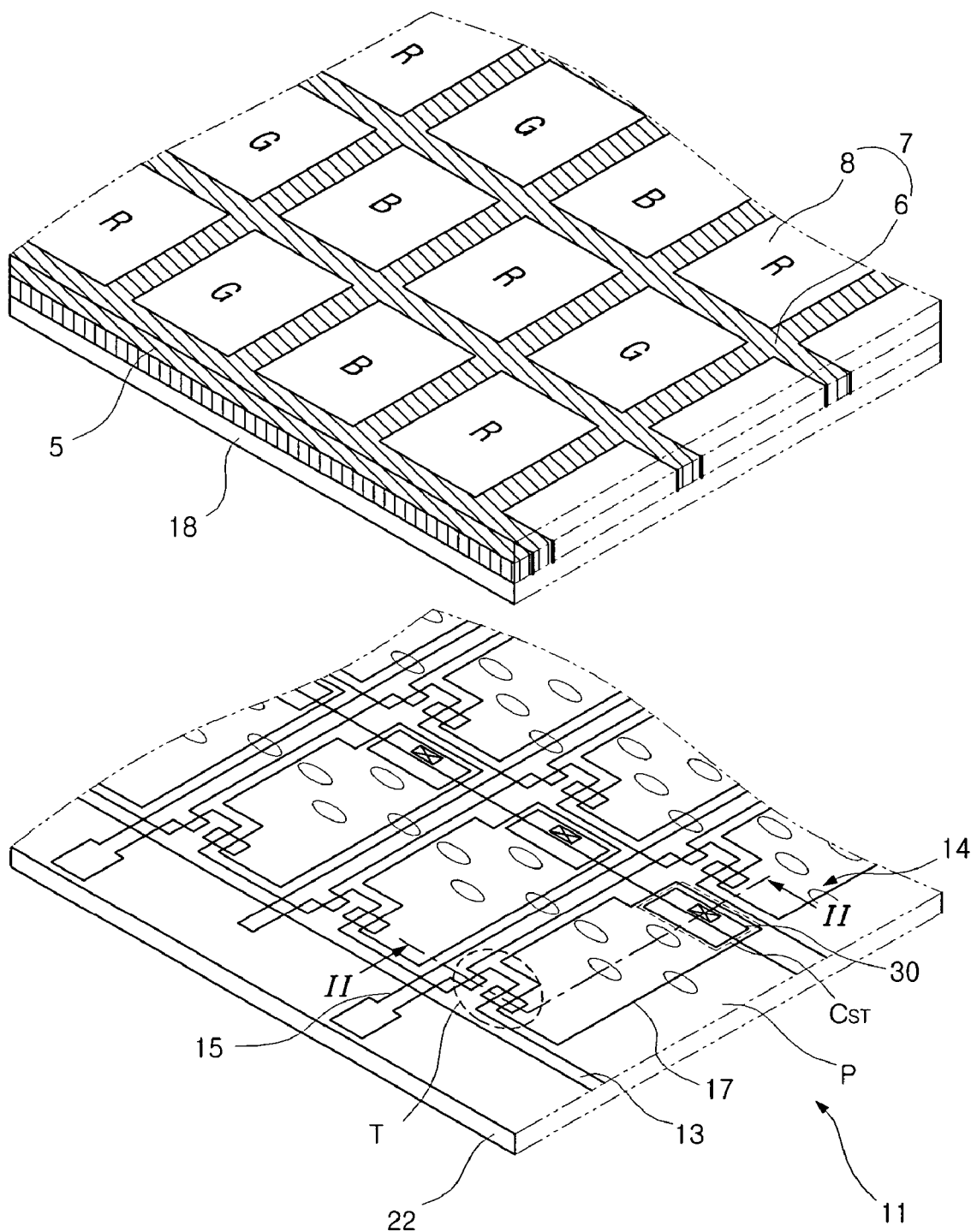
FIG. 1 is an exploded perspective view of a liquid crystal display device according to the related art.
Figure 2:
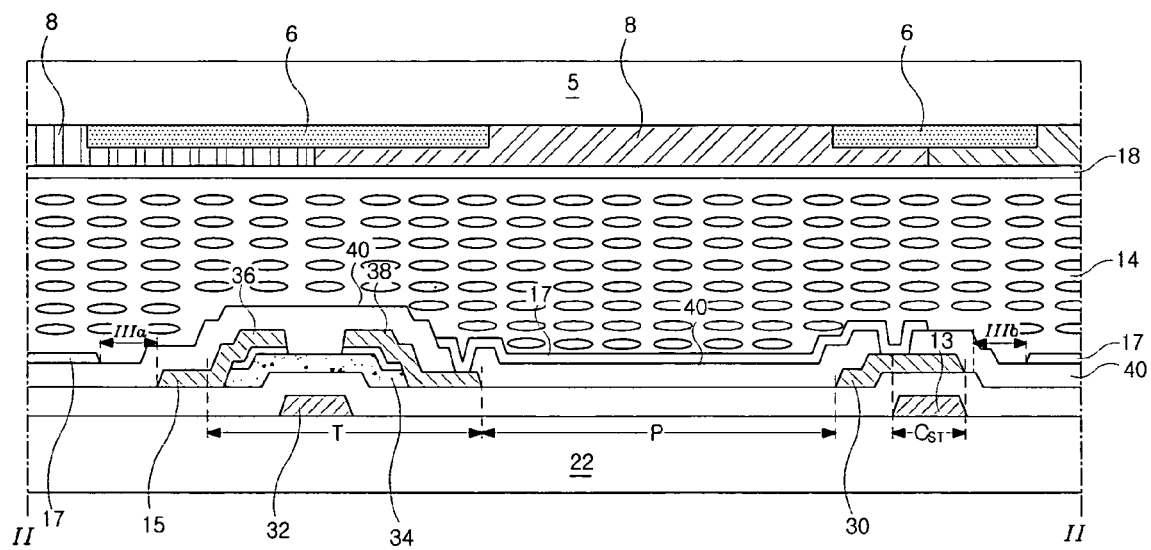
FIG. 2 is a schematic cross-sectional view taken along a line "II—II" of FIG. 1.
Figure 3:
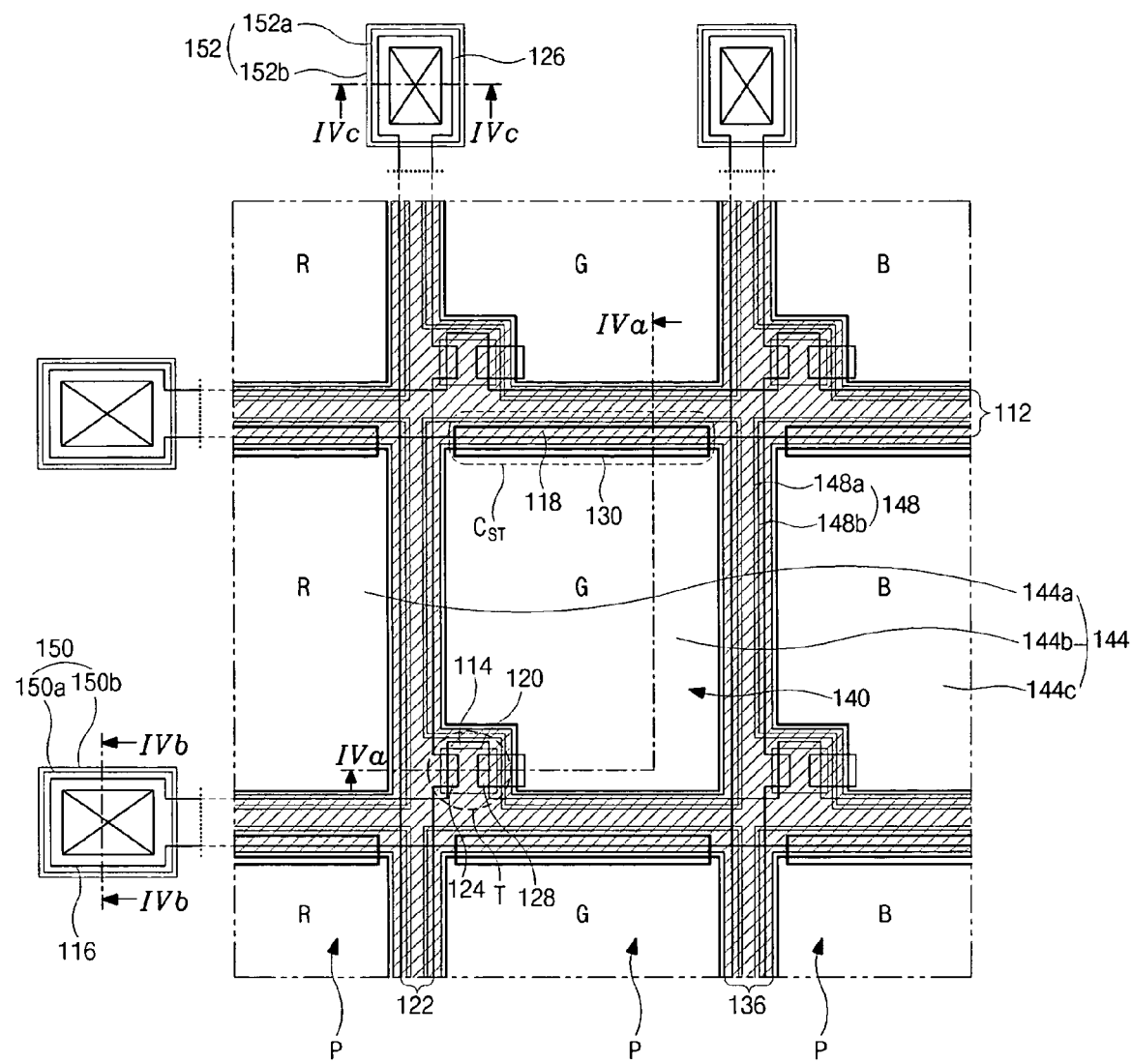
FIG. 3 is a schematic plane view showing a substrate for a color filter on thin film transistor (COT) type liquid crystal display (LCD) device according to an embodiment of the present invention.
Figure 4A:
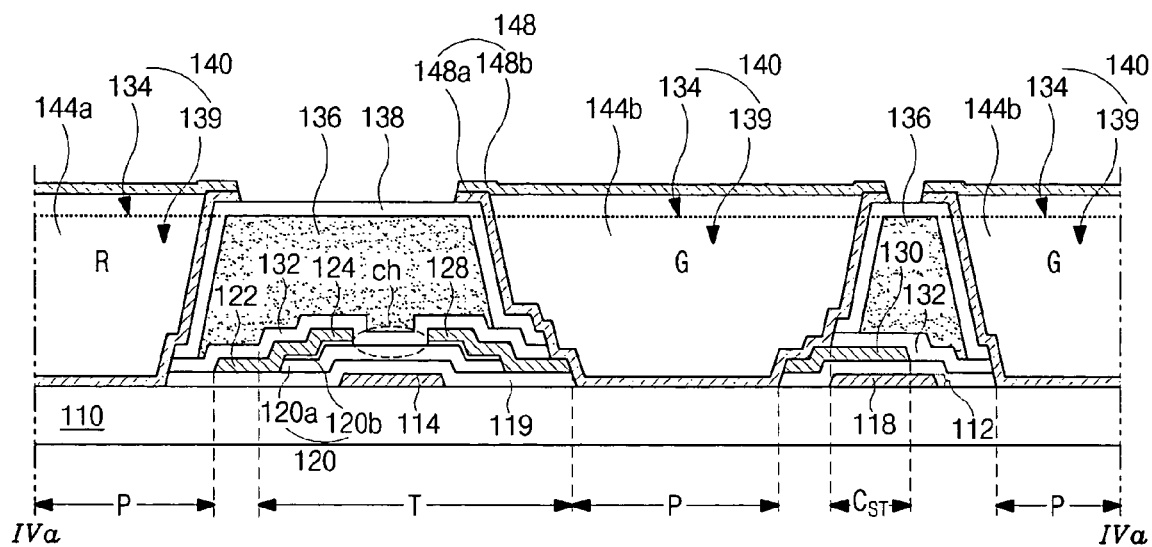
FIG. 4A is a schematic cross-sectional view taken along a line "IVa—IVa" of FIG. 3.
Figure 4B:
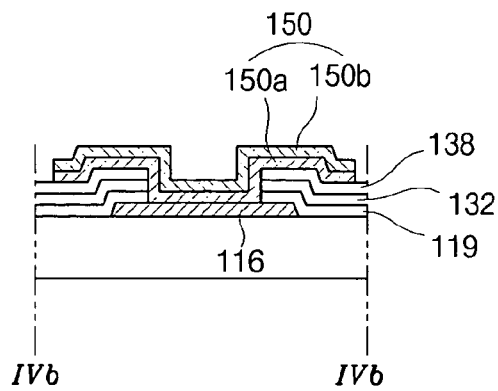
FIG. 4B is a schematic cross-sectional view taken along a line "IVb—IVb of FIG. 3.
Figure 4C:
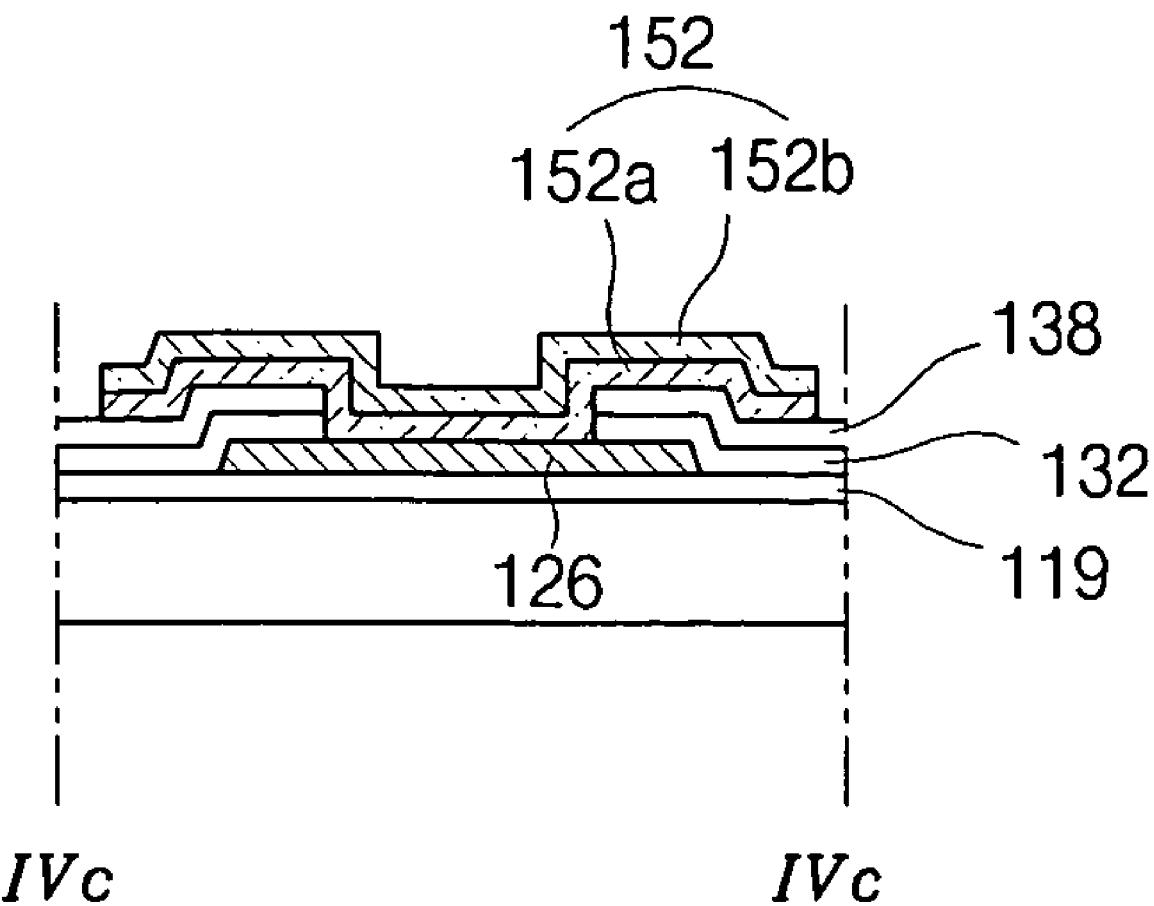
FIG. 4C is a schematic cross-sectional view taken along a line "IVc—IVc" of FIG. 3.

FIG. 3 is a schematic plane view showing a substrate for a color filter on thin film transistor (COT) type liquid crystal display (LCD) device according to an embodiment of the present invention. FIG. 4A is a schematic cross-sectional view taken along a line "IVa—IVa" of FIG. 3, FIG. 4B is a schematic cross-sectional view taken along a line "IVb—IVb of FIG. 3, and FIG. 4C is a schematic cross-sectional view taken along a line "IVc—IVc" of FIG. 3.

As shown in FIGS. 3, 4A, 4B and 4C, a gate line 112 is formed on a substrate 110 along a first direction. A gate electrode 114 extends from the gate line 112 and a gate pad 116 is formed at an end of the gate line 112. A portion of the gate line 112 functions as a first capacitor electrode 118. A gate insulating layer 119 is formed on the gate line 112, the gate electrode 114, the gate pad 116, the first capacitor electrode 118. A semiconductor layer 120 is formed on the gate insulating layer 119 over the gate electrode 114 and a data line 122 is formed on the semiconductor layer 120 along a second direction crossing the first direction. A source electrode 124 extends from the data line 122 to overlap the semiconductor layer 120 and a data pad 126 is formed at one end of the data line 122. Moreover, a drain electrode 128 spaced apart from the source electrode 124 is formed to overlap the semiconductor layer 120 and a second capacitor electrode 130 of an island shape is formed to correspond to the first capacitor electrode 118. For example, the source and drain electrodes 124 and 128 may be formed of the same material as the data line 122 through a single process.

The semiconductor layer 120 includes an active layer 120a of intrinsic amorphous silicon and an ohmic contact layer 120b of impurity-doped amorphous silicon. Since the ohmic contact layer 120b between the source and drain electrodes 124 and 128 is removed, the active layer 120a is exposed between the source and drain electrodes 124 and 128 and the exposed active layer 120a constitutes a channel region "ch." In addition, the gate electrode 114, the semiconductor layer 120, the source electrode 124 and the drain electrode 128 constitute a thin film transistor (TFT) "T." A first passivation layer 132 is formed on the TFT "T" and a black matrix 136 is formed on the first passivation layer 132. The black matrix 136 has a first open portion 134 corresponding to the pixel region "P." Since the black matrix 136 covers the channel region "ch," the black matrix 136 shields ambient light. Accordingly, the ambient light is not irradiated onto the channel region "ch" and generation of a photocurrent in the channel region "ch" is prevented.

A second passivation layer 138 is formed on the black matrix 136. The second passivation layer 138, the first passivation layer 132 and the gate insulating layer 119 have a second open portion 139 corresponding to the first open portion 134. The second open portion 139 exposes the drain electrode 128, the second capacitor electrode 130 and the substrate 110. A first pixel electrode layer 148a is formed on the second passivation layer 138. The first pixel electrode layer 148a directly contacts the drain electrode 128 and the second capacitor electrode 130 through the second open portion 139. A first gate pad terminal layer 150a and a first data pad terminal layer 152a are formed on the gate pad 116 and the data pad 126, respectively. The first gate pad terminal layer 150a and the first data pad terminal layer 152a are formed of the same material as the first pixel electrode layer 148a through a single process. The first and second open portions 134 and 139 may be referred to as an open portion 140.

A color filter layer 144 including red, green and blue sub-color filters 144a, 144b and 144c is formed on the first pixel electrode layer 148a in the open portion 140. The red, green and blue sub-color filters 144a, 144b and 144c are alternately disposed in each pixel region "P." A second pixel electrode layer 148b is formed on the color filter layer 144. In addition, a second gate pad terminal layer 150b and a second data pad terminal layer 152b are formed on the first gate pad terminal layer 150a and the first data pad terminal layer 152a, respectively. The second gate pad terminal layer 150b and the second data pad terminal layer 152b are formed of the same material as the second pixel electrode layer 148b through a single process. The first and second pixel electrode layers 148a and 148b constitute a pixel electrode 148. Moreover, the first and second gate pad terminal layers 150a and 150b constitute a gate pad terminal 150, and the first and second data pad terminal layers 152a and 152b constitute a data pad terminal 152. The first and second capacitor electrodes 118 and 130 constitute a storage capacitor "$C_{ST}$" with the gate insulating layer 119 interposed therebetween.

In this COT type LCD device, however, since the gate pad of a metallic material including aluminum (Al) contacts the gate pad terminal of a metallic material including indium-tin-oxide (ITO) and indium-zinc-oxide (IZO), the gate pad and the gate pad terminal may be corroded by a galvanic phenomenon. To solve the above problems and improve a viewing angle, an in-plane switching (IPS) mode COT type LCD device according to an embodiment is suggested.

Figure 5:
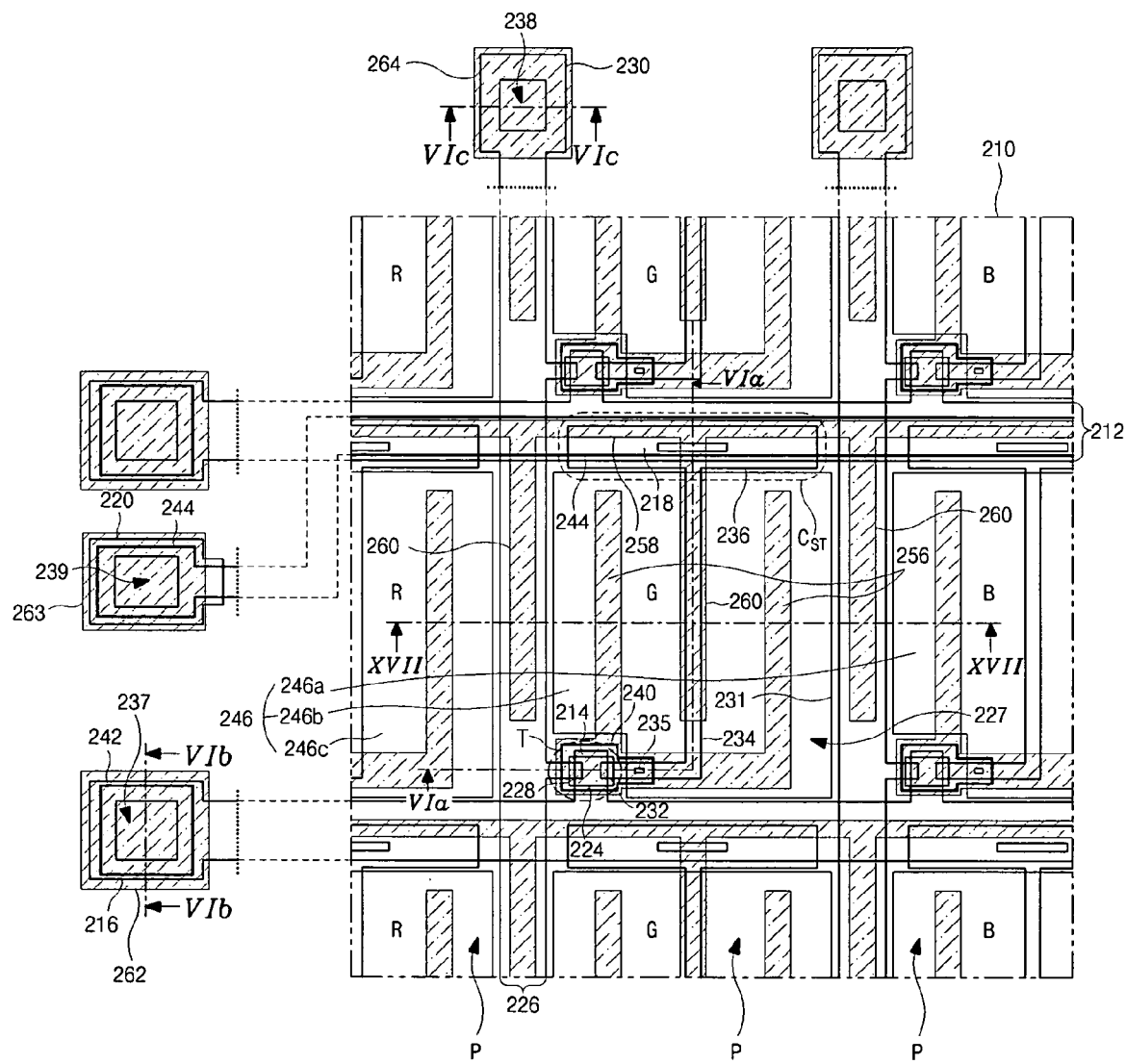
FIG. 5 is a schematic plane view showing a substrate for an in-plane switching (IPS) mode color filter on thin film transistor (COT) type liquid crystal display (LCD) device according to an embodiment of the present invention.
Figure 6A:
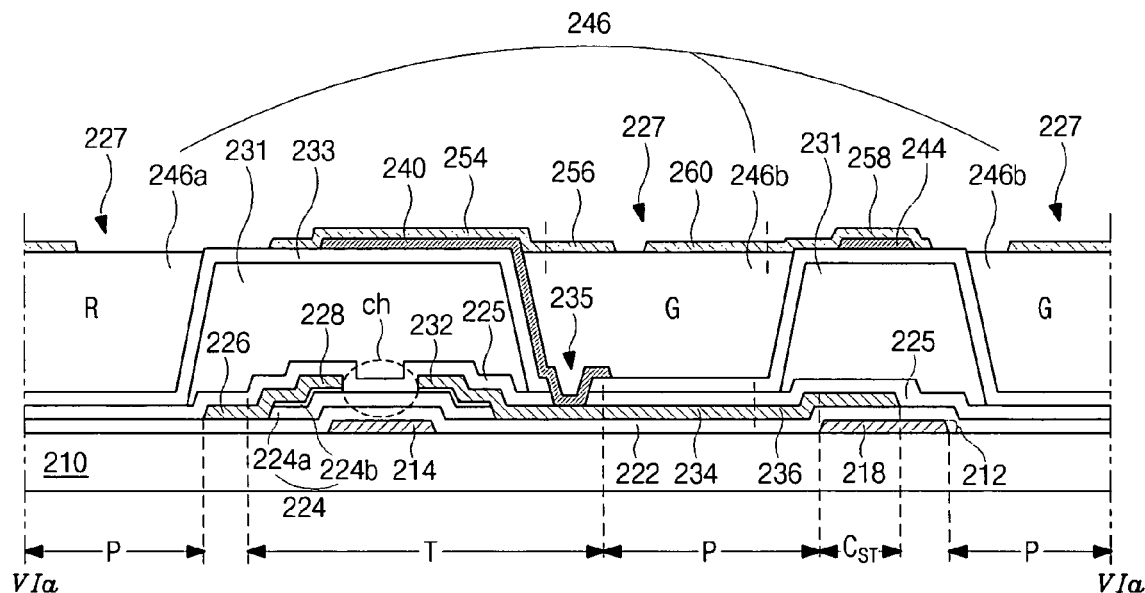
FIG. 6A is a schematic cross-sectional view taken along a line "VIa—VIa" of FIG. 5.
Figure 6B:
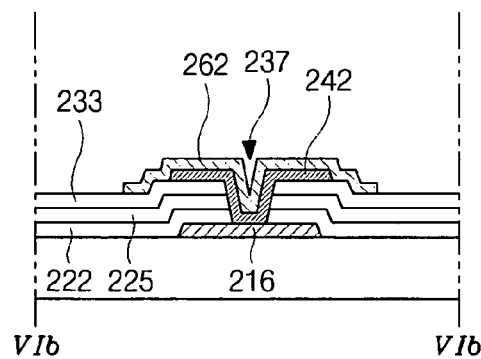
FIG. 6B is a schematic cross-sectional view taken along a line "VIb—VIb of FIG. 5.
Figure 6C:
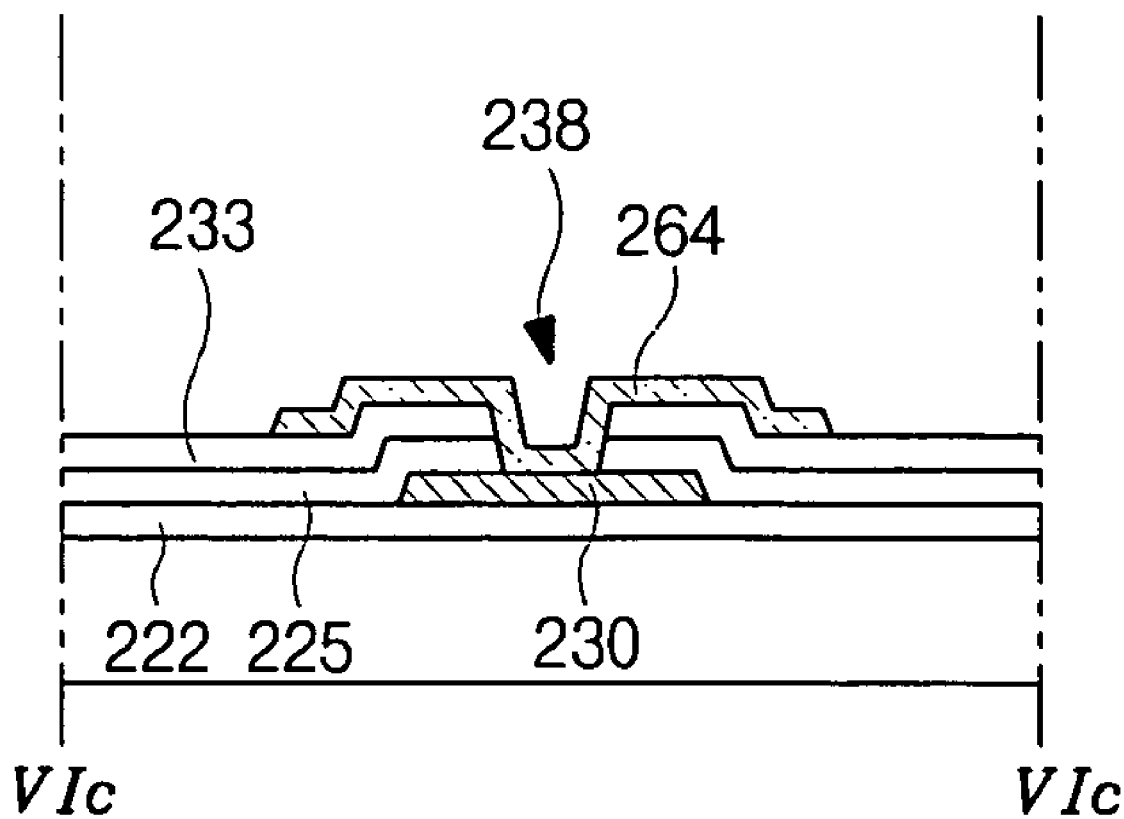
FIG. 6C is a schematic cross-sectional view taken along a line "VIc—VIc" of FIG. 5.
Figure 7A:
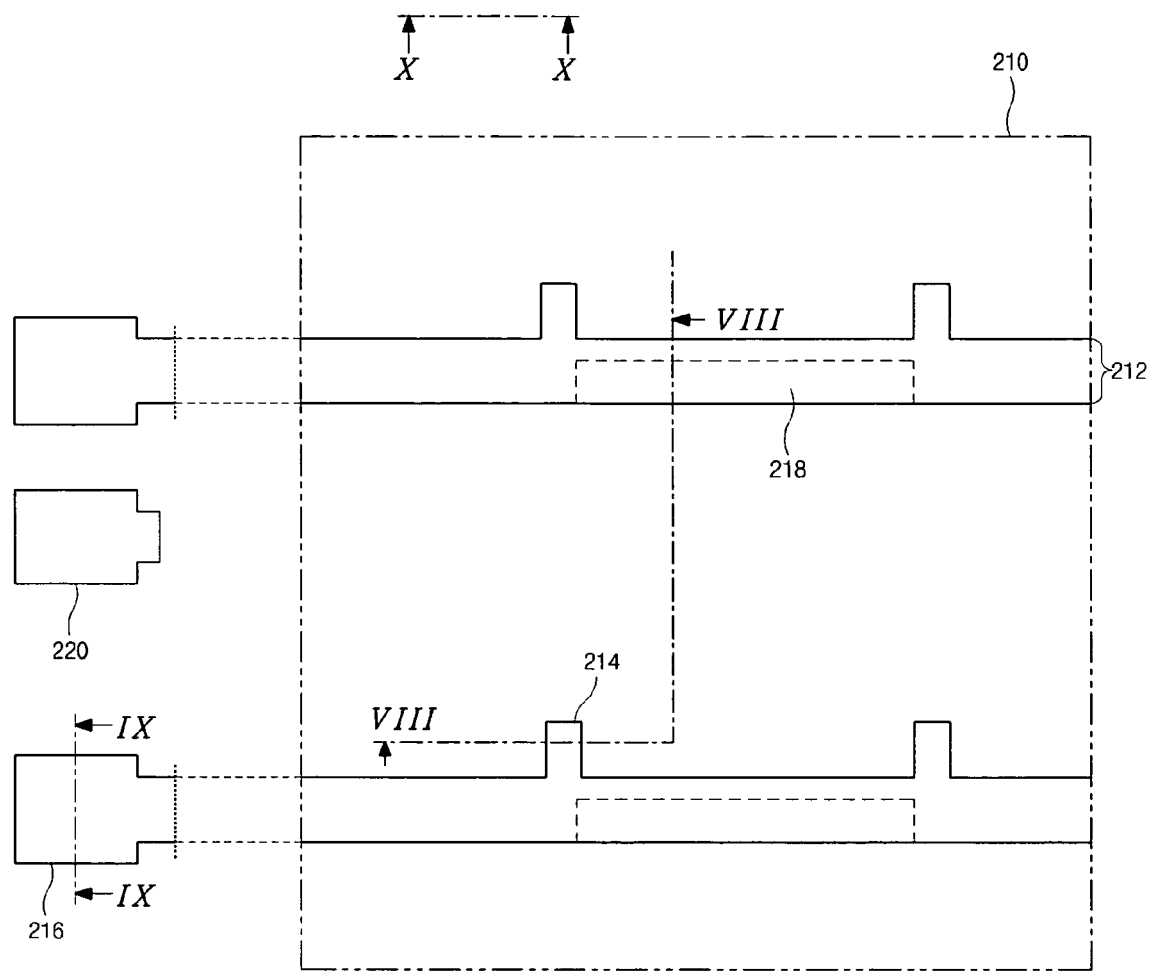
FIGS. 7A to 7H are schematic cross-sectional views showing a fabricating process of a substrate for an in-plane switching mode color filter in a thin film transistor type liquid crystal display device according to an embodiment of the present invention.
Figure 7B:
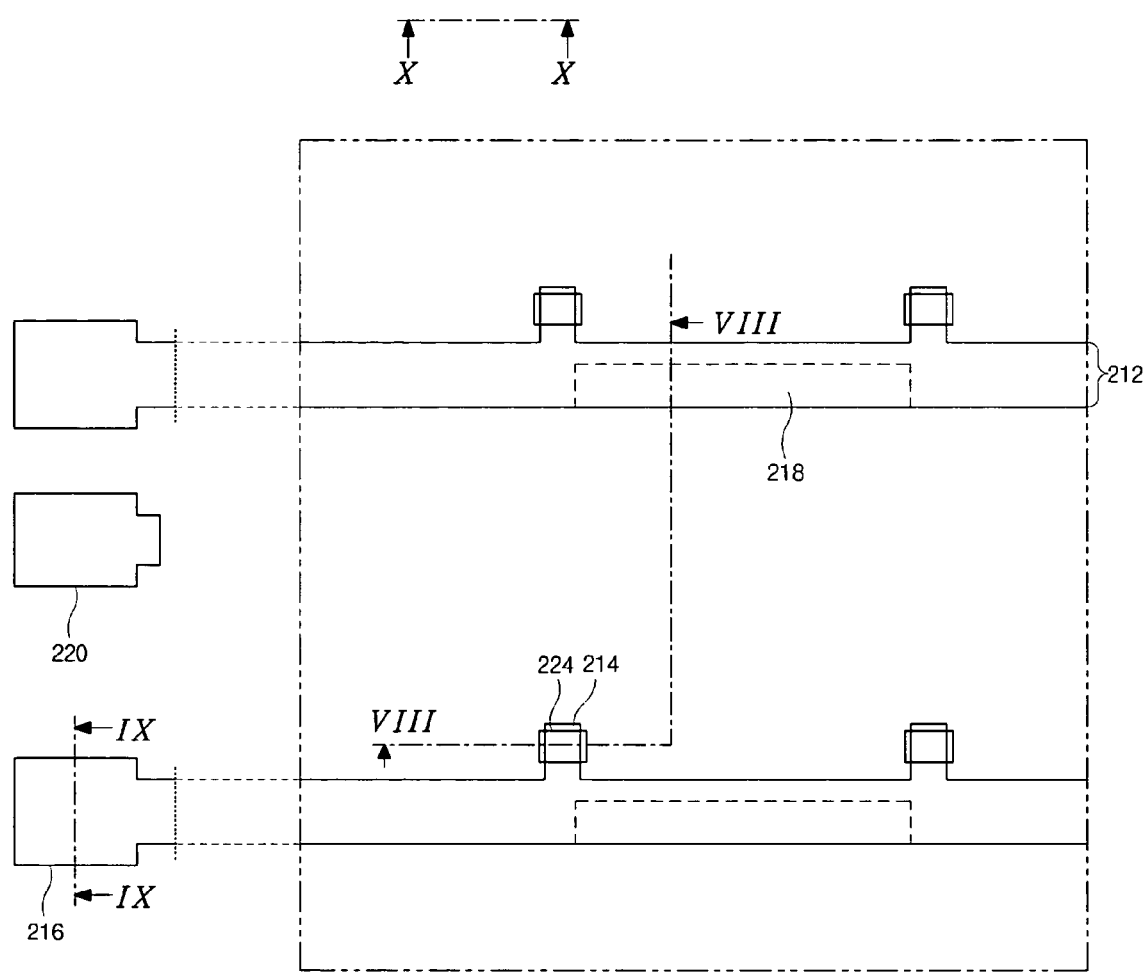
Figure 7C:
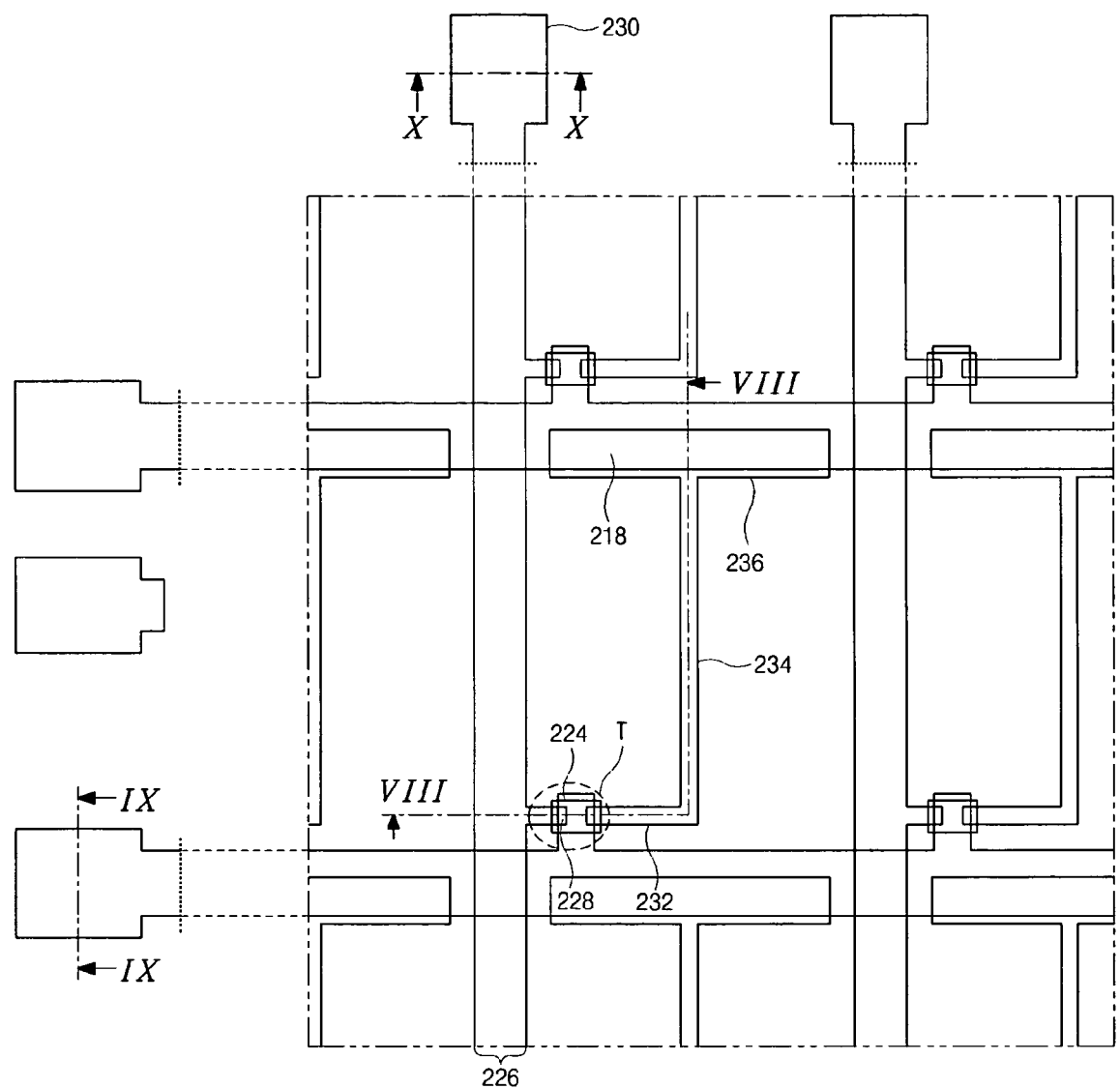
Figure 7D:
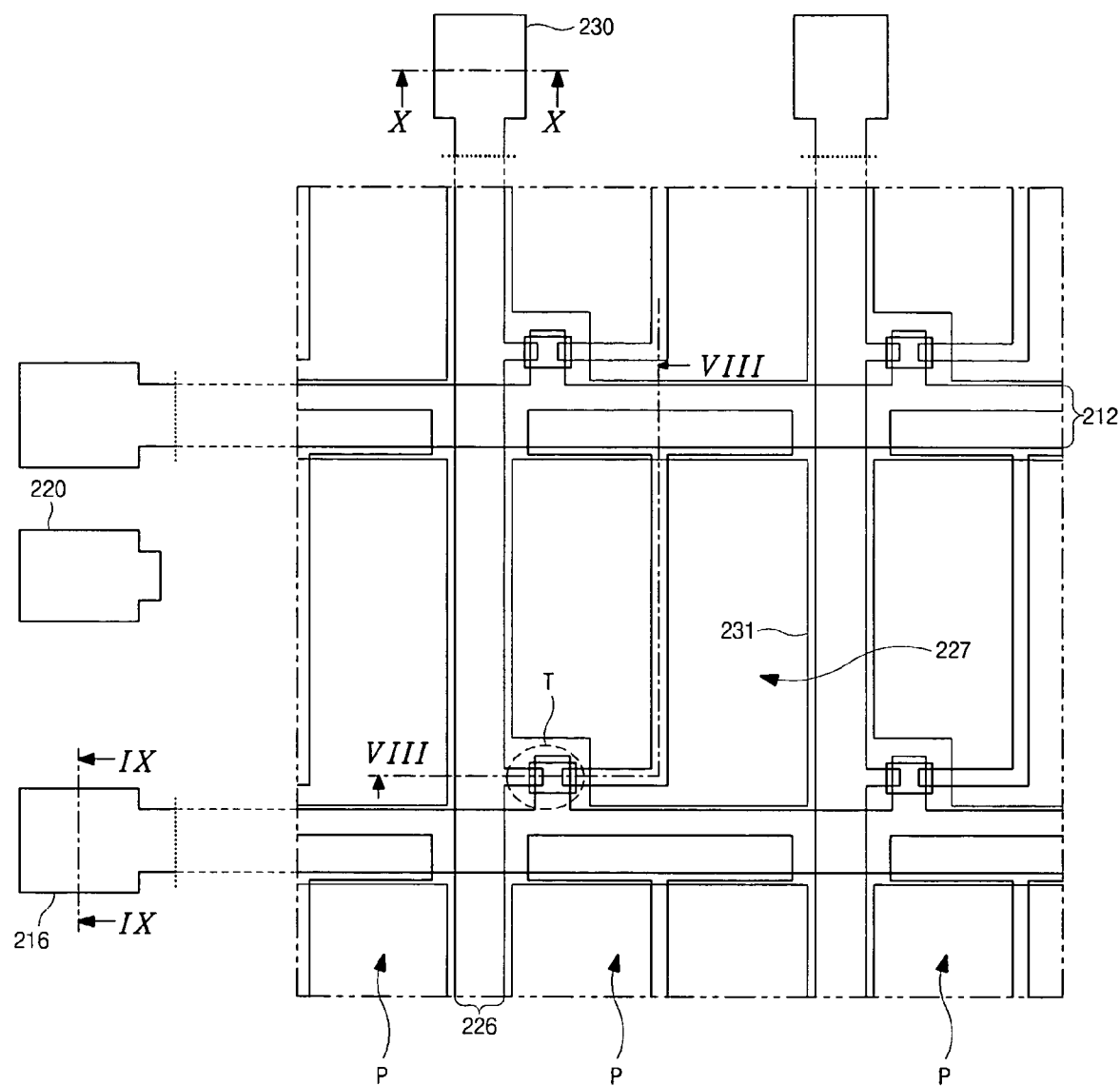
Figure 7E:
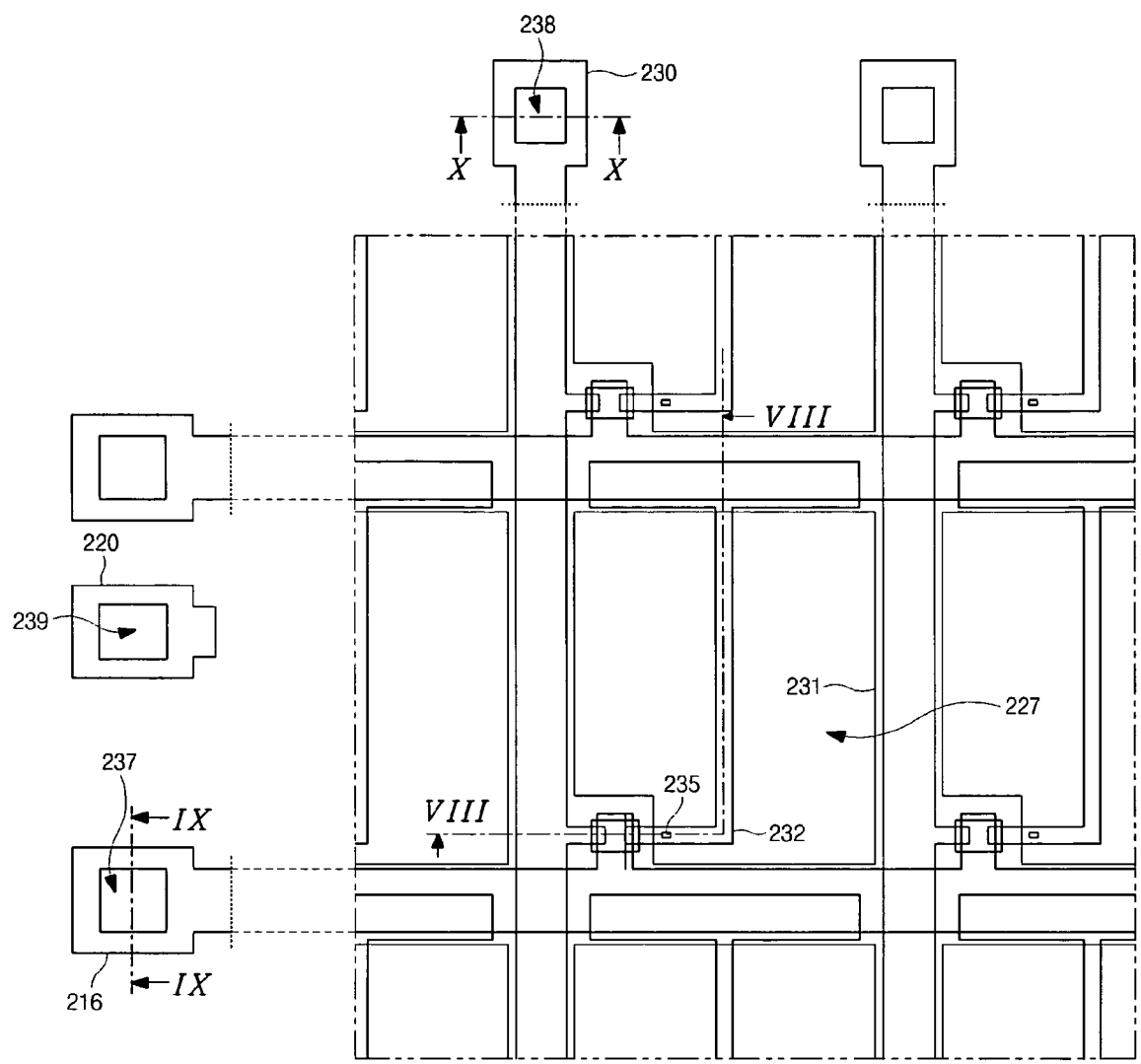
Figure 7F:
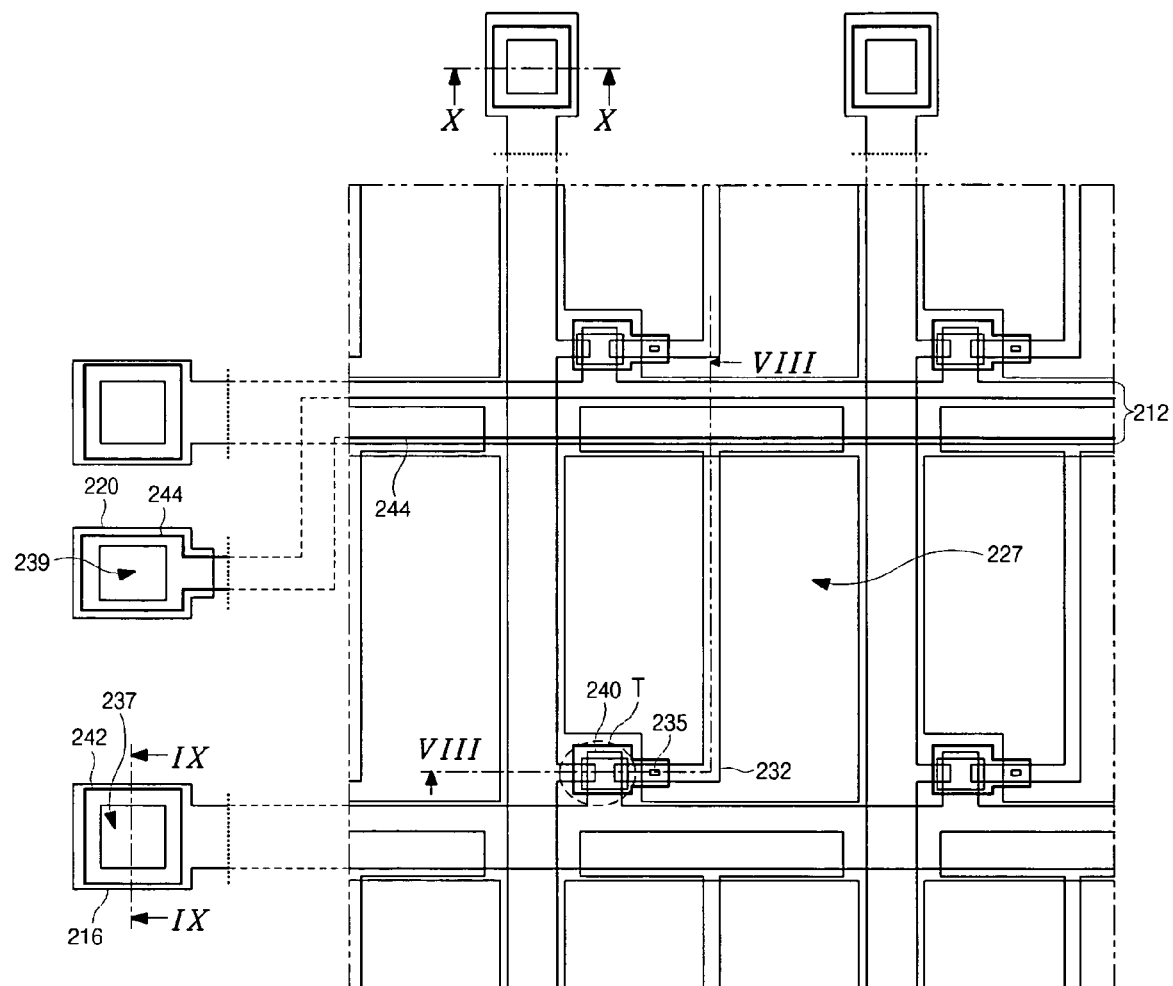
Figure 7G:
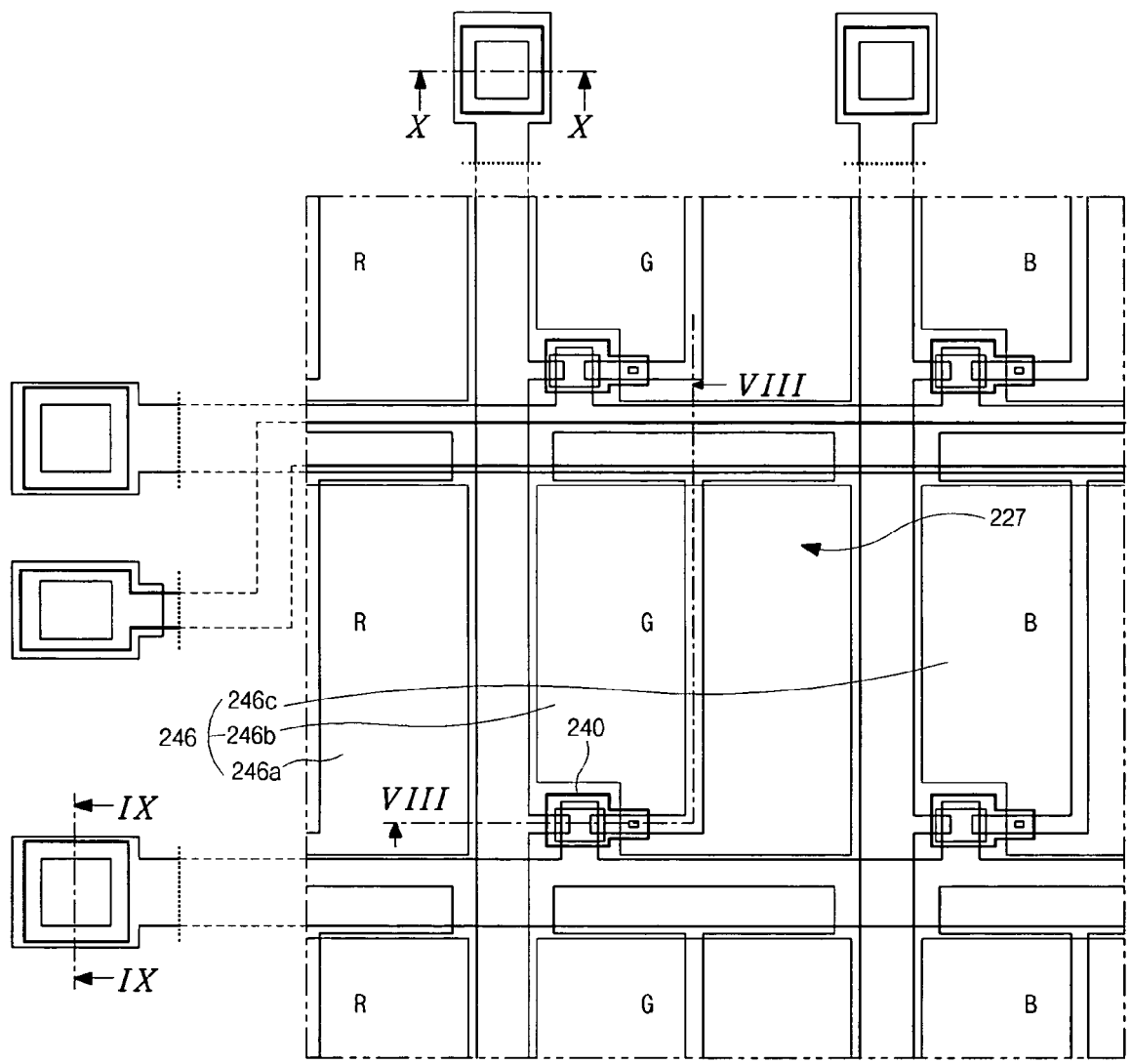
Figure 7H:
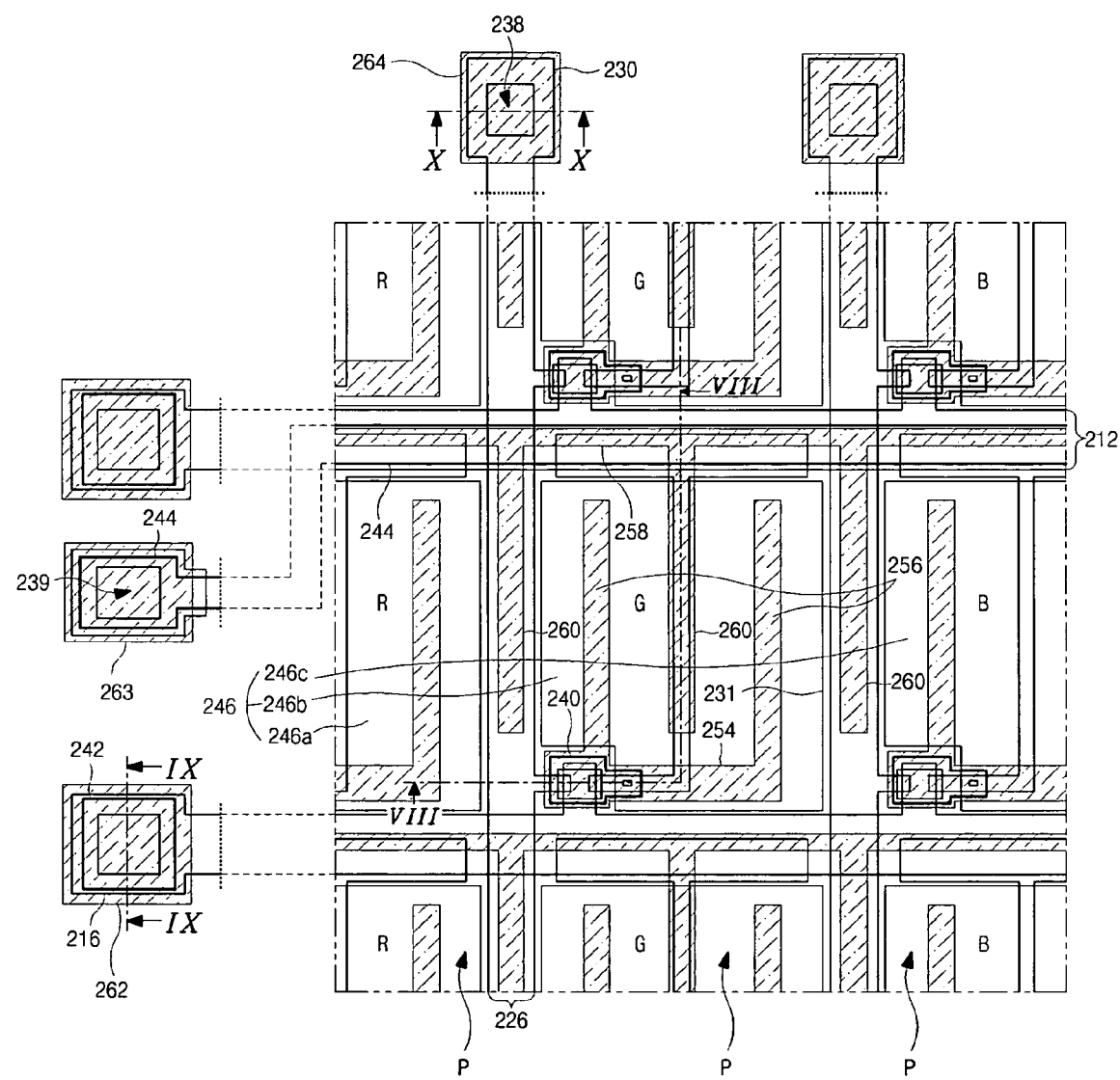
Figure 8A:
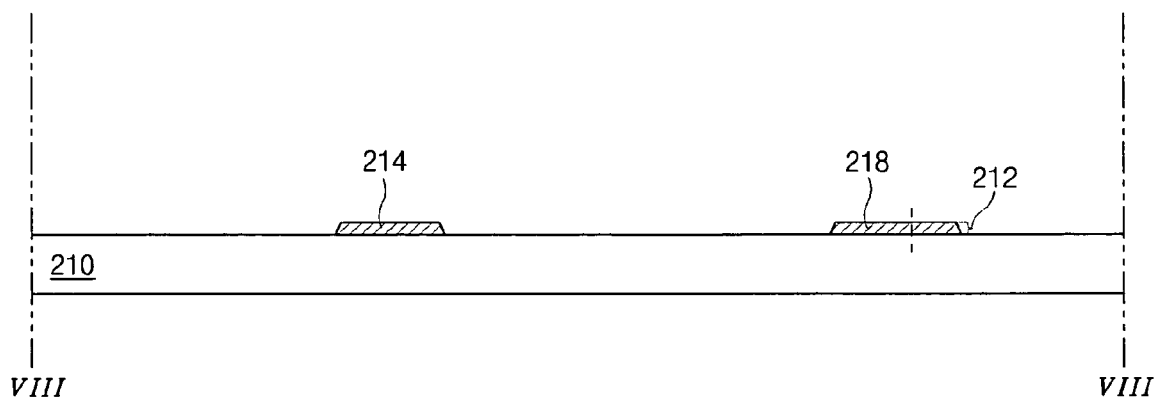
FIGS. 8A to 8H are schematic cross-sectional views, which are taken along a line "VIII—VIII" of FIGS. 7A to 7H, showing a fabricating process of a substrate for an in-plane switching mode color filter in a thin film transistor type liquid crystal display device according to an embodiment of the present invention.
Figure 8B:
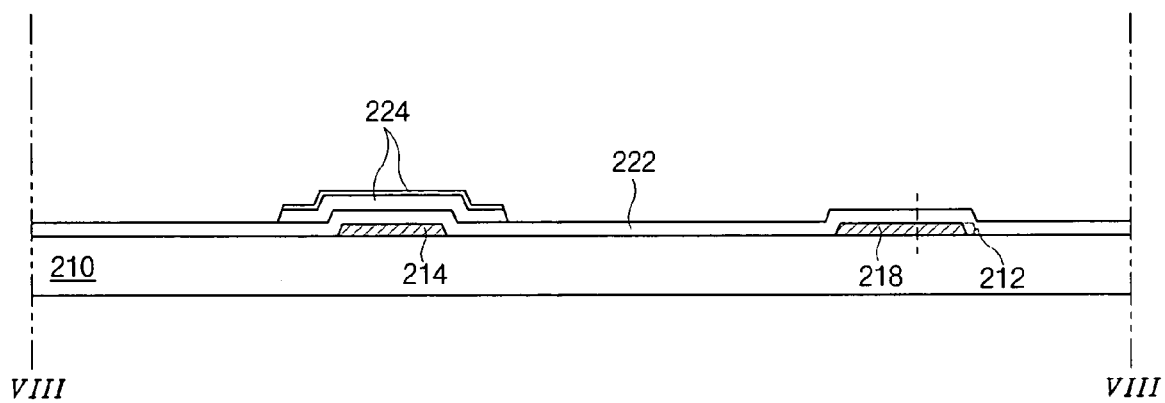
Figure 8C:
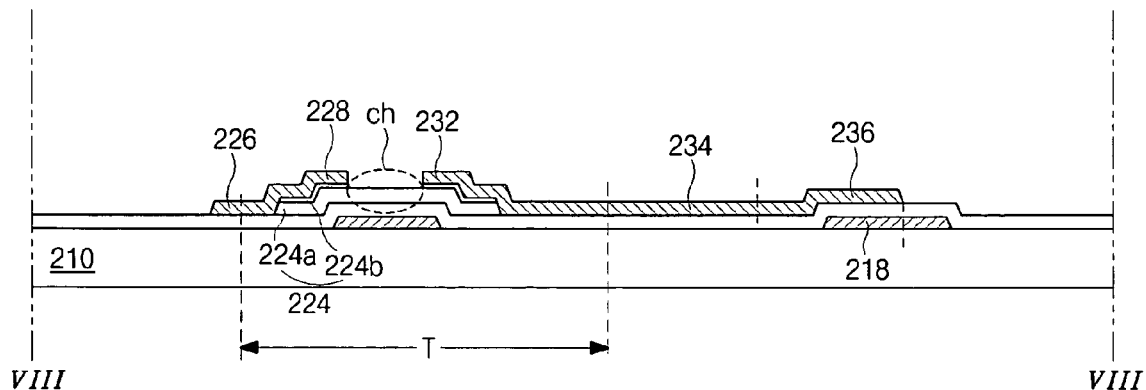
Figure 8D:
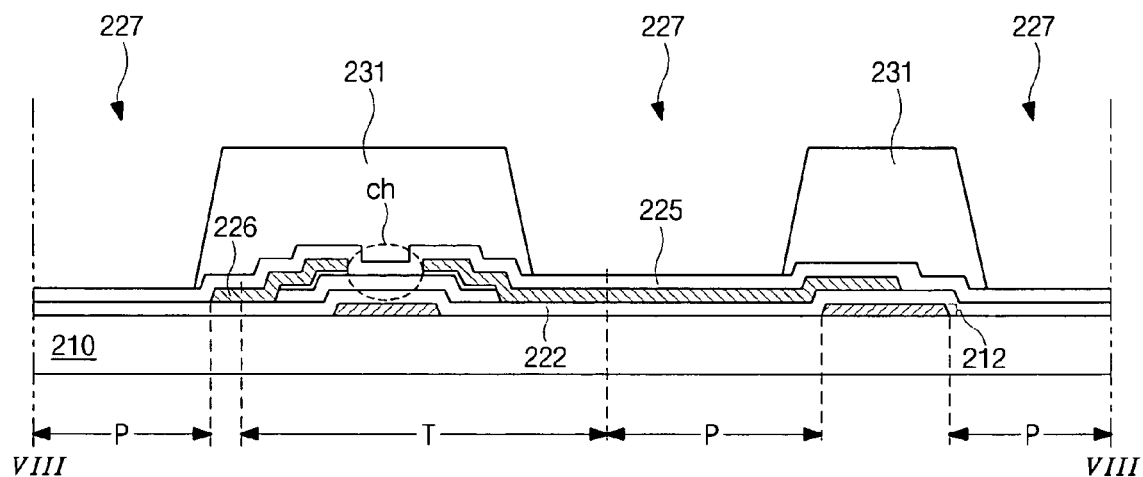
Figure 8E:
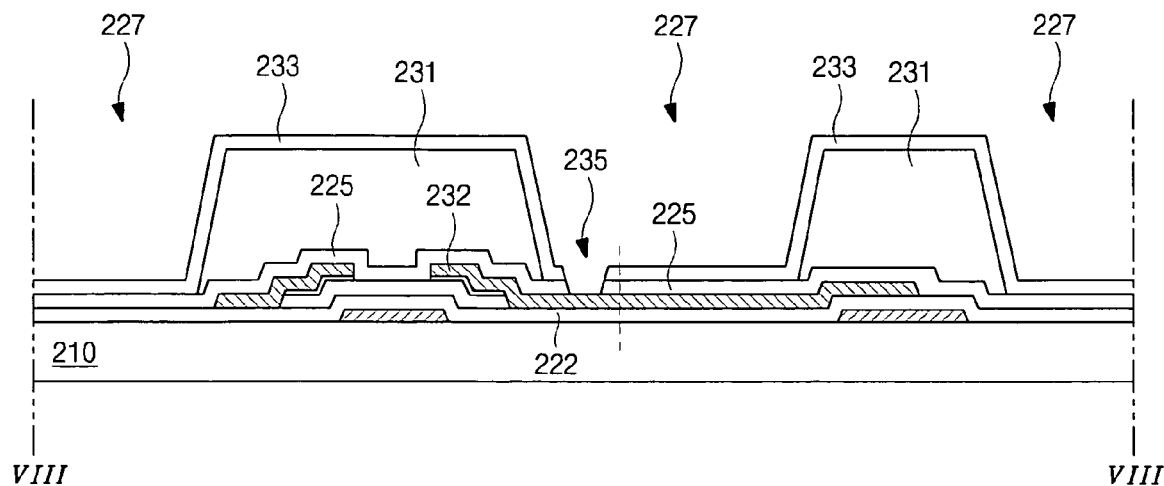
Figure 8F:
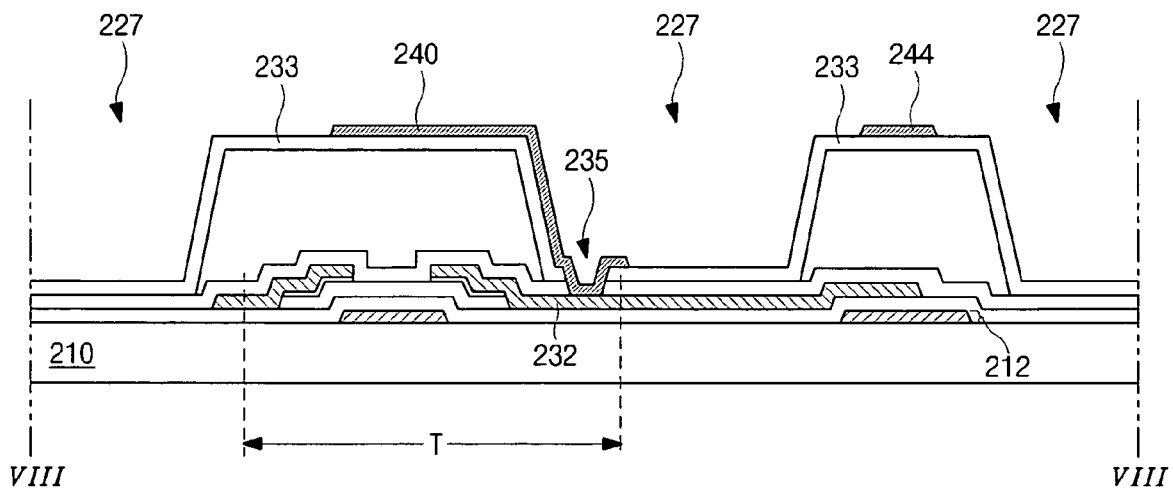
Figure 8G:
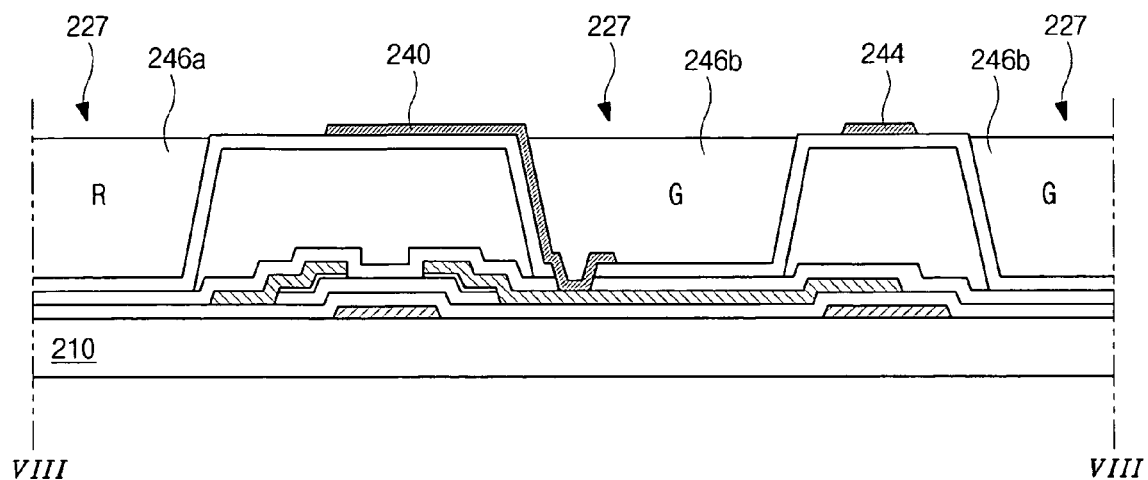
Figure 8H:
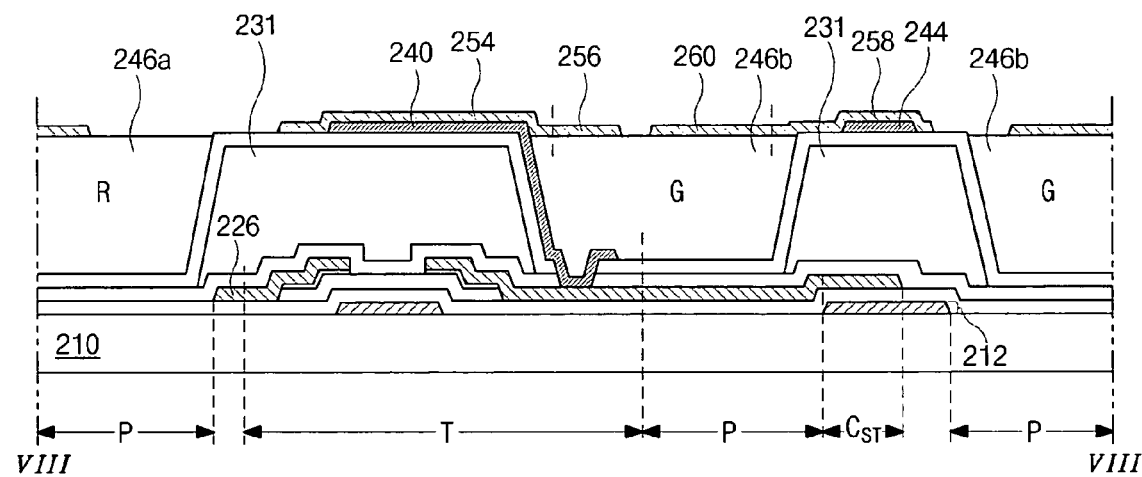
Figure 9A:
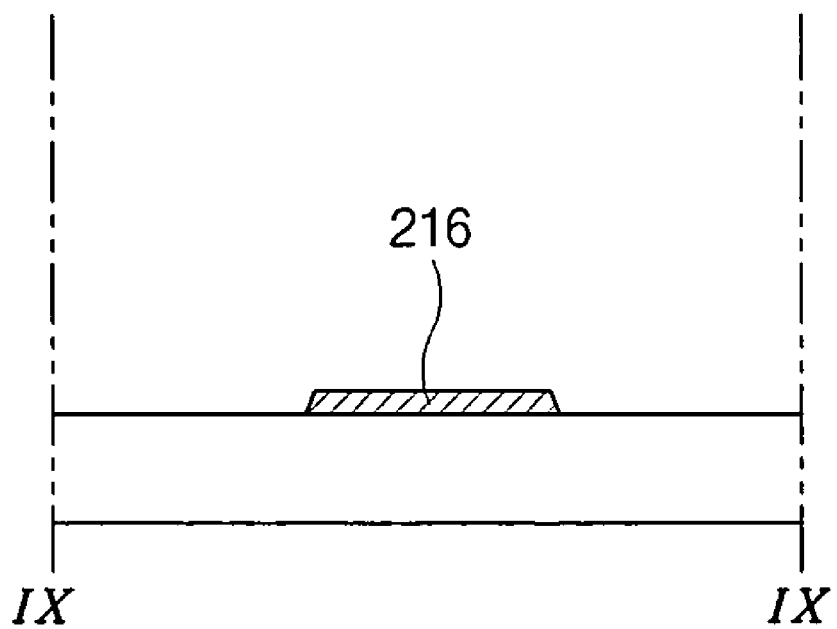
FIGS. 9A to 9H are schematic cross-sectional views, which are taken along a line "IX—IX" of FIGS. 7A to 7H, showing a fabricating process of a substrate for an in-plane switching mode color filter in a thin film transistor type liquid crystal display device according to an embodiment of the present invention.
Figure 9B:
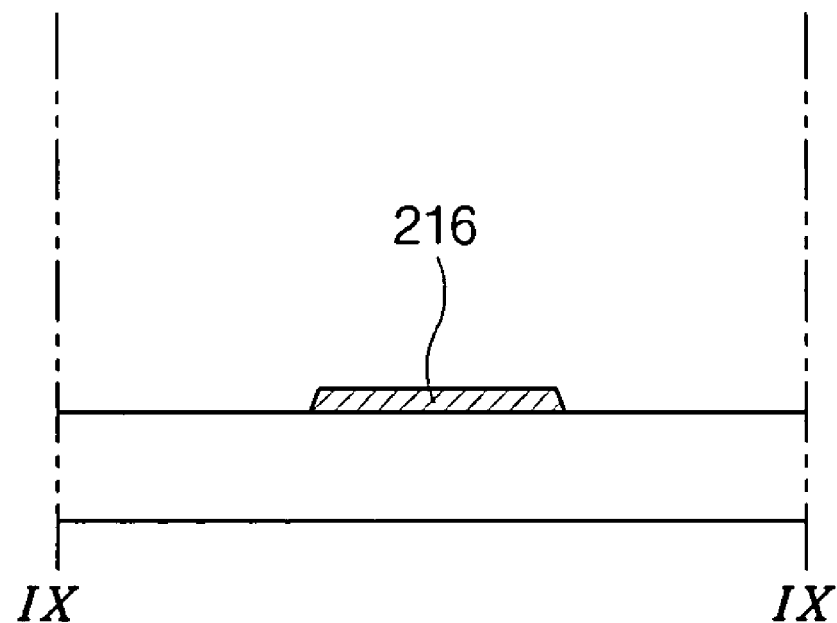
Figure 9C:
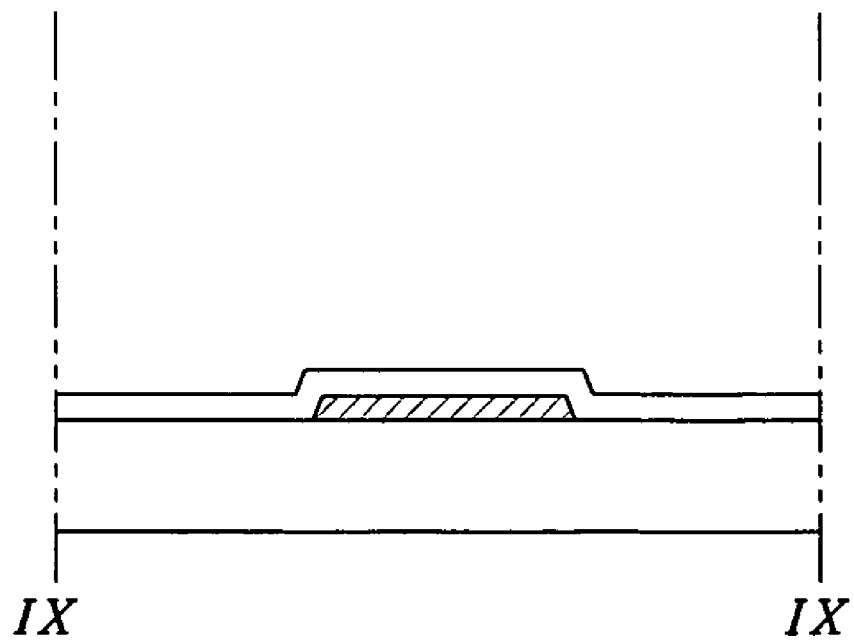
Figure 9D:
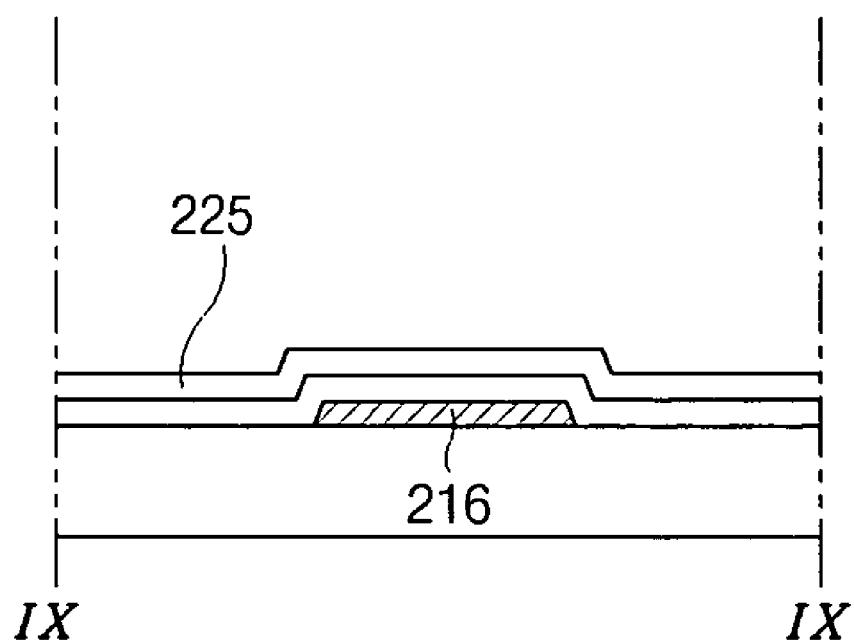
Figure 9E:
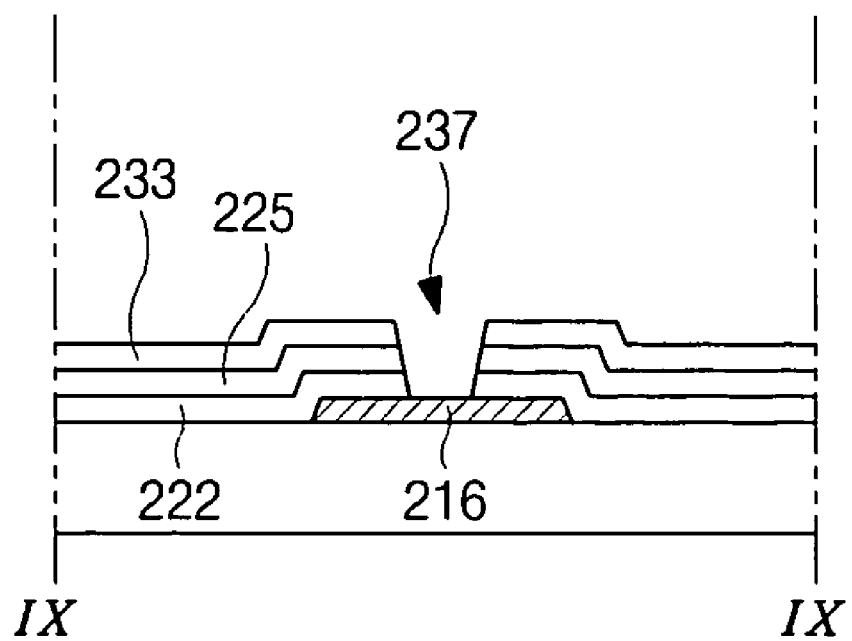
Figure 9F:
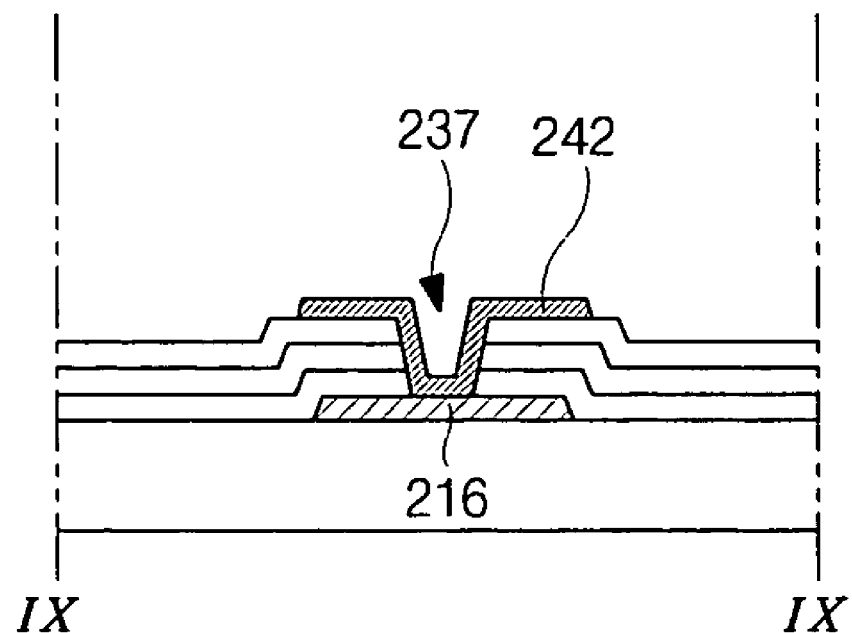
Figure 9G:
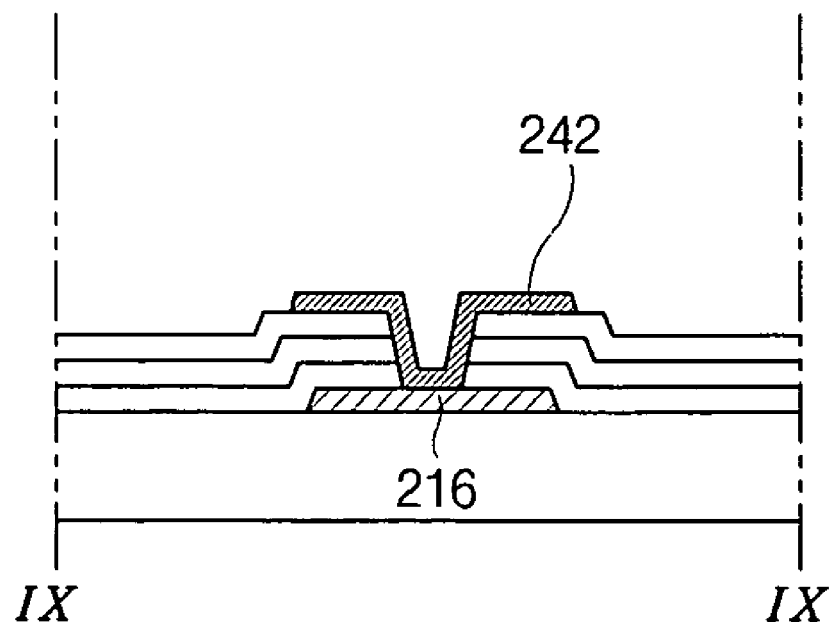
Figure 9H:
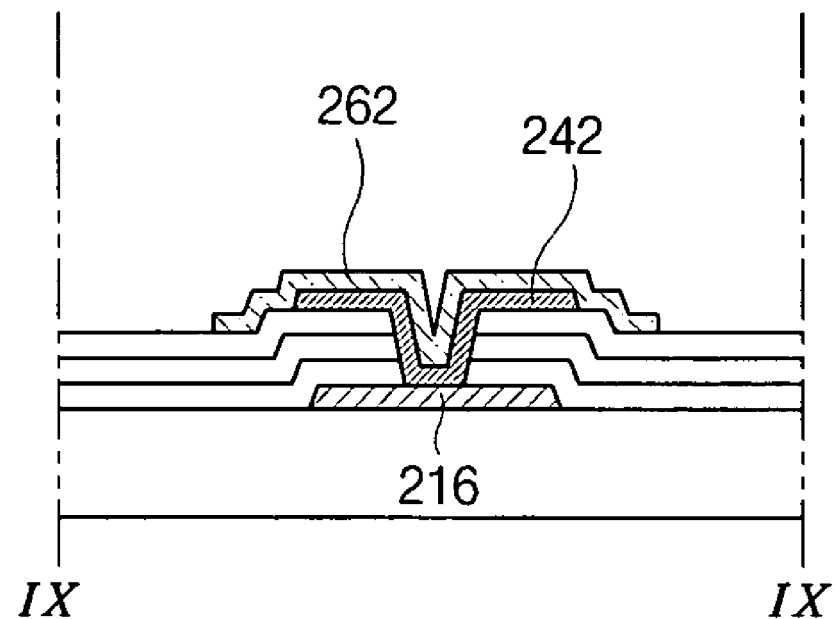
Figure 10A:
FIGS. 10A to 10H are schematic cross-sectional views, which are taken along a line "X—X" of FIGS. 7A to 7H, showing a fabricating process of a substrate for an in-plane switching mode color filter in a thin film transistor type liquid crystal display device according to an embodiment of the present invention.
Figure 10B:
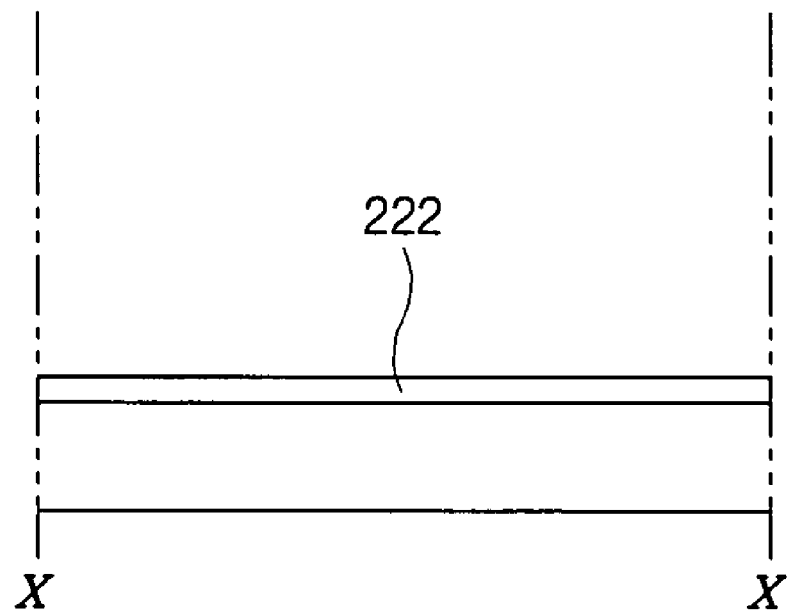
Figure 10C:
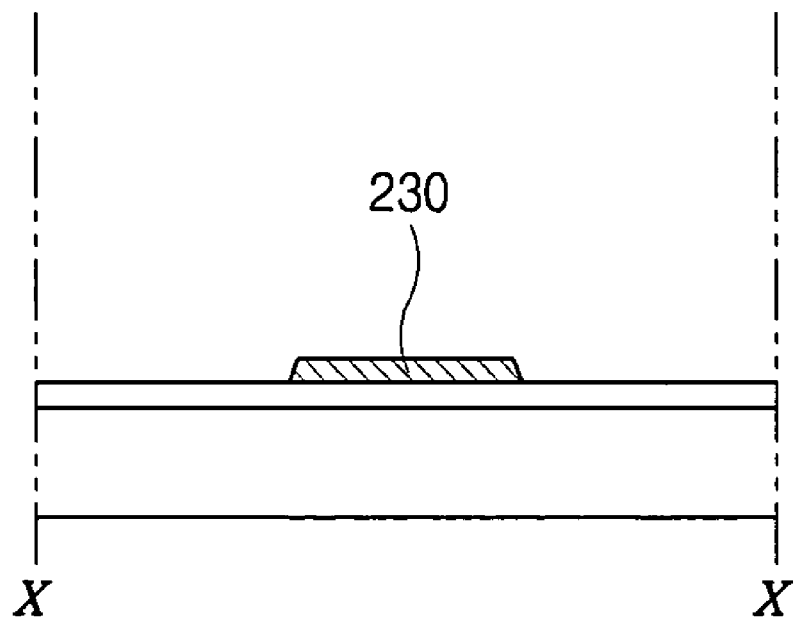
Figure 10D:
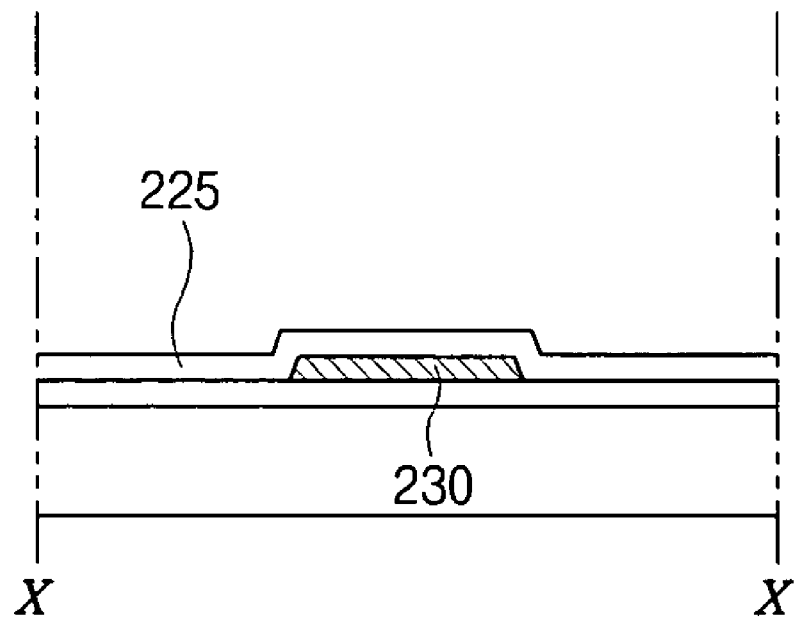
Figure 10E:
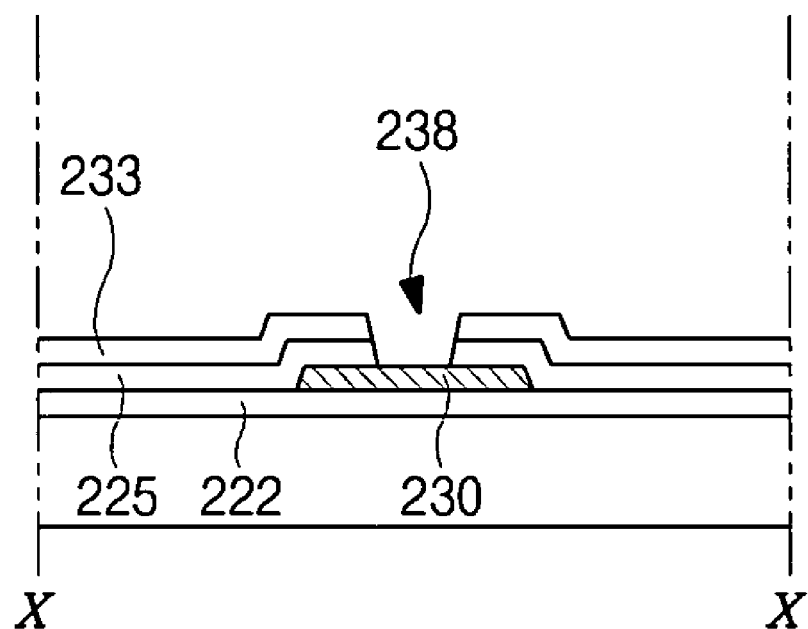
Figure 10F:
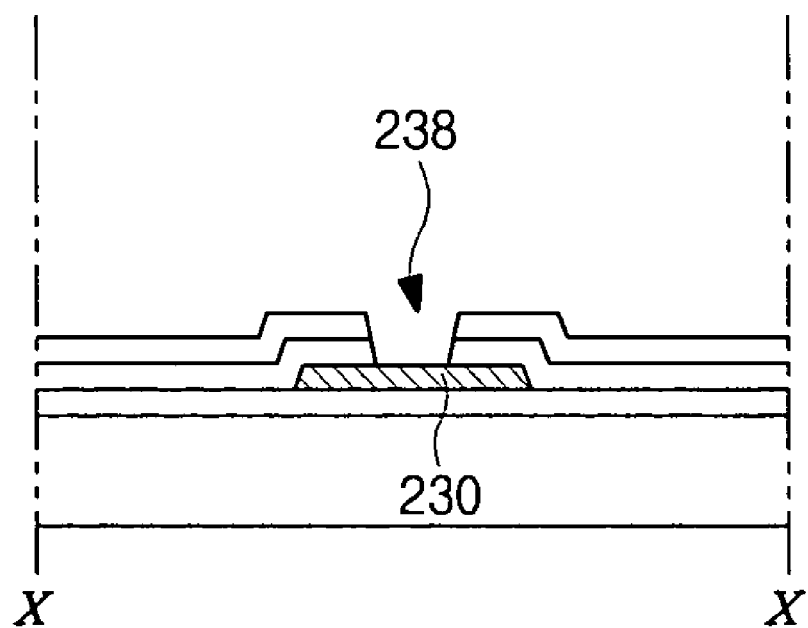
Figure 10G:
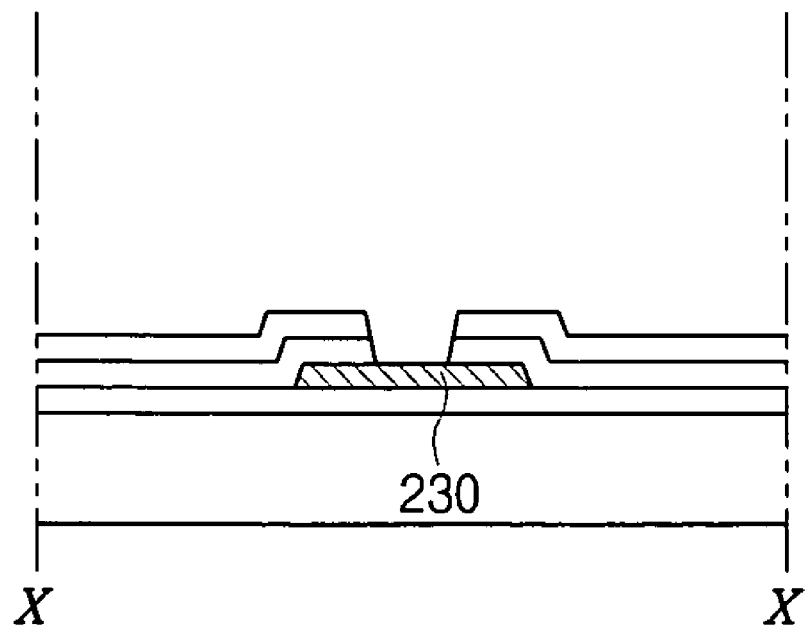
Figure 10H:
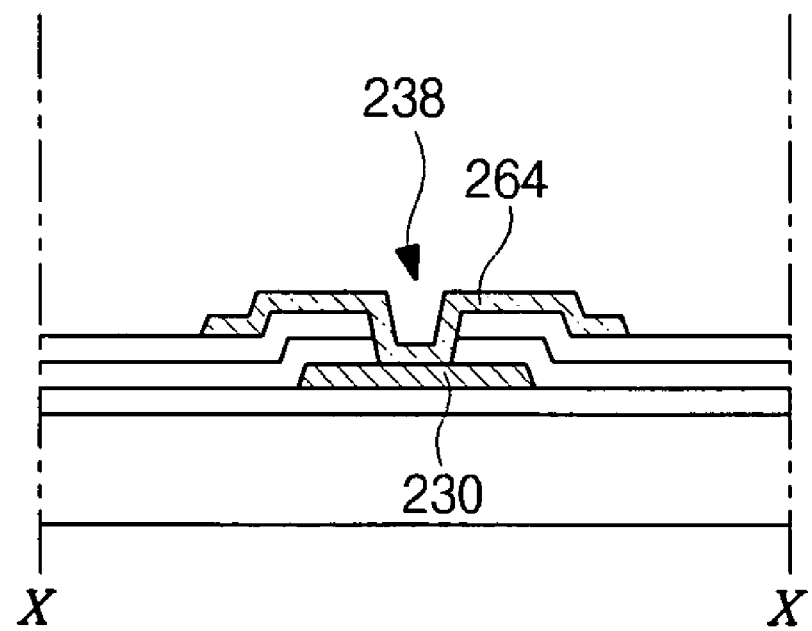

FIG. 5 is a schematic plane view showing a substrate for an in-plane switching (IPS) mode color filter on thin film transistor (COT) type liquid crystal display (LCD) device according to an embodiment of the present invention. FIG. 6A is a schematic cross-sectional view taken along a line "VIa—VIa" of FIG. 5, FIG. 6B is a schematic cross-sectional view taken along a line "VIb—VIb of FIG. 5, and FIG. 6C is a schematic cross-sectional view taken along a line "VIc—VIc" of FIG. 5.

As shown in FIGS. 5, 6A, 6B and 6C, a gate line 212 including a gate electrode 214, a gate pad 216 and a first capacitor electrode 218 is formed on a substrate 210 along a first direction. The gate electrode 214 extends from the gate line 212 and the gate pad 216 is formed at an end of the gate line 212. A portion of the gate line 212 functions as the first capacitor electrode 218. In addition, a common pad 220 of an island shape is disposed between the adjacent gate pads 216. The common pad 220 is formed of the same material as the gate line 212 through a single process. Even though not shown in FIG. 5, a plurality of common lines of a subsequent process are combined and one common line 244 is connected to the common pad 220. Accordingly, a signal of an external circuit is applied to the plurality of common lines through the common pad 220.

A gate insulating layer 222 is formed on the gate line 212 and the common pad 220. A semiconductor layer 224 is formed on the gate insulating layer 222 over the gate electrode 214 and a data line 226 is formed on the semiconductor layer 224 along a second direction crossing the first direction. The semiconductor layer 224 includes an active layer 224a of intrinsic amorphous silicon and an ohmic contact layer 224b of impurity-doped amorphous silicon. In addition, a source electrode 228 extends from the data line 226 to overlap the semiconductor layer 224 and a data pad 230 is formed at one end of the data line 226. A drain electrode 232 spaced apart from the source electrode 228 is formed to overlap the semiconductor layer 224. A first connection electrode 234 is disposed along the second direction extends from the drain electrode 232 and a second capacitor electrode 236 corresponding to the first capacitor electrode 218 extends from the first connection electrode 234. For example, the source electrode 228, the drain electrode 232, the first connection electrode 234 and the second capacitor electrode 236 may be formed of the same material as the data line 226 through a single process. The first and second capacitor electrodes 218 and 236 constitute a storage capacitor "$C_{ST}$" with the gate insulating layer 222 interposed therebetween.

The gate electrode 214, the semiconductor layer 224, the source electrode 228 and the drain electrode 232 constitute a thin film transistor (TFT) "T." Since the ohmic contact layer 224b between the source and drain electrodes 228 and 232 is removed, the active layer 224a is exposed between the source and drain electrodes 228 and 232 and the exposed active layer 224a constitutes a channel region "ch." In addition, a first passivation layer 225 is formed on the TFT "T." The first passivation layer may be formed of a silicon insulating material such as silicon nitride (SiNx) and silicon oxide ($SiO_2$). A black matrix 231 is formed on the first passivation layer 225. The black matrix 231 has an open portion 227 corresponding to the pixel region "P." Since the black matrix 231 covers the channel region "ch," the black matrix 231 shields ambient light. Accordingly, the ambient light is not irradiated onto the channel region "ch" and generation of a photocurrent in the channel region "ch" is prevented.

The black matrix 231 is formed of light shielding resin. For example, the resin for the black matrix 231 may have a resistivity higher than about $10^{10}$ Ωcm and a dielectric constant lower than about 20. The resin may include carbon particles for shielding light. When the resin includes carbon particles, the carbon particles may be coated with an insulating material to prevent signal delay due to the carbon particles.

A second passivation layer 233 is formed on the black matrix 231. The second passivation layer 233 and the first passivation layer 225 have a drain contact hole 235 exposing the drain electrode 232 of the open portion 227 and a data pad contact hole 238 exposing the data pad 230. In addition, the second passivation layer 233, the first passivation layer 225 and the gate insulating layer 222 have a gate pad contact hole 237 exposing the gate pad 216 and a common pad contact hole 239 exposing the common pad 220. A second connection electrode 240, an auxiliary gate pad terminal 242 and a common line 244 are formed on the second passivation layer 233. The second connection electrode 240 is connected to the drain electrode 232 through the drain contact hole 235 and the auxiliary gate pad terminal 242 is connected to the gate pad 216 through the gate pad contact hole 237. The common line 244 is connected to the common pad 220 through the common pad contact hole 239 and is disposed to correspond to the gate line 212.

The second connection electrode 240 and the auxiliary gate pad terminal 242 may have an island shape. The second connection electrode 240 is disposed over the TFT "T." The second connection electrode 240 connects the TFT "T" to a pixel electrode 256 through a color filter layer 246 in a subsequent process. Accordingly, the second connection electrode 240 may extend beyond the open portion 227 on the basis of an area for the color filter layer 246. In addition, the auxiliary gate pad terminal 242 may be formed of a metallic material excluding aluminum (Al) to prevent a corrosion by a galvanic phenomenon between the gate pad 216 of a metallic material including aluminum (Al) and a gate pad terminal 262 of a metallic material including indium-tin-oxide (ITO) and indium-zinc-oxide (IZO).

A color filter layer 246 including red, green and blue sub-color filters 246a, 246b and 246c is formed on the second connection electrode 240 in the open portion 227. The red, green and blue sub-color filters 246a, 246b and 246c are alternately disposed in each pixel region "P." A pixel connection line 254 is formed on the second connection electrode 240 and a plurality of pixel electrodes 256 extend from the pixel connection line 254. In addition, a common connection line 258 is formed on the common line 244 and a plurality of common electrodes 260 extend from the common connection line 258. At least one of the plurality of common electrodes 260 corresponds to the data line 226. A gate pad terminal 262, a common pad terminal 263 and a data pad terminal 264 are formed of the same material as the pixel electrode 256 and the common electrode 260 through a single process. The gate pad terminal 262 is connected to the gate pad 216 through the auxiliary gate pad terminal 242 interposed between the gate pad terminal 262 and the gate pad 216, and the data pad terminal 264 is connected to the data pad 230.

Even though the first and second passivation layers 225 and 233 are shown as being formed, the first and second passivation layers 225 and 233 may be omitted. Moreover, an auxiliary data pad terminal may be formed between the data pad 230 and the data pad terminal 264 of the same material as the auxiliary gate pad terminal 242 through a single process. Accordingly, the common line and at least one common electrode overlap the gate line and the data line, respectively, and the black matrix of a resin having relatively low dielectric constant and relatively high resistivity is interposed therebetween. Since an aperture ratio may be determined from a gap between the common electrode and the pixel electrode, aperture ratio is improved. Moreover, the gate pad terminal is connected to the gate pad through the auxiliary gate pad terminal preventing corrosion by a galvanic phenomenon.

In an IPS mode COT type LCD device according to an embodiment of the present invention, since a color filter layer and a black matrix are formed on a single substrate having a TFT, light leakage is effectively prevented due to omission of alignment margin. Since a pixel electrode and a common electrode are formed on a single substrate, a liquid crystal layer is driven by a lateral electric field and a viewing angle is improved. In addition, since an auxiliary gate pad terminal of a metallic material excluding aluminum (Al) is formed between a gate pad and a gate pad terminal, corrosion by a galvanic phenomenon is prevented at a gate pad portion. Moreover, a common line and a common electrode pixel overlap a gate line and a data line, respectively, and a black matrix having relatively low dielectric constant and relatively high resistivity is interposed therebetween. Therefore, an aperture ratio is improved.

FIGS. 7A to 7H, 8A to 8H, 9A to 9H, and 10A to 10H are schematic cross-sectional views showing a fabricating process of a substrate for an in-plane switching mode color filter on thin film transistor type liquid crystal display device according to embodiments of the present invention. FIGS. 8A to 8H are taken along a line "VIII—VIII" of FIGS. 7A to 7H, FIGS. 9A to 9H are taken along a line "IX—IX" of FIGS. 7A to 7H, and FIGS. 10A to 10H are taken along a line "X—X" of FIGS. 7A to 7H.

In FIGS. 7A, 8A, 9A and 10A, after a first metallic material is deposited on a substrate 210, a gate line 212 along a first direction, a gate electrode 214 extending from the gate line 212, a gate pad 216 disposed at one end of the gate line 212 and a common pad 220 of an island shape are formed through a first mask process. A portion of the gate line 212 constitutes a first capacitor electrode 218. The common pad 220 disposed between the adjacent gate lines 212 connected to a common line in a subsequent process and a signal of an external circuit is applied to a plurality of common lines through the common pad 220. The first metallic material having a relatively low resistivity may include aluminum (Al).

In FIGS. 7B, 8B, 9B and 10B, after a gate insulating layer 222 is formed on the gate line 212, the gate electrode 214, the gate pad 216, the first capacitor electrode 218 and the common pad 220, an intrinsic amorphous silicon material and an impurity-doped amorphous silicon material are sequentially deposited on the gate insulating layer 222. Next, a semiconductor layer 224 is formed over the gate electrode 214 through a second mask process.

In FIGS. 7C, 8C, 9C and 10C, after a second metallic material is deposited on the semiconductor layer 224, a data line 226, a data pad 230, a source electrode 228, a drain electrode 232, a first connection electrode 234 and a second capacitor electrode 236 are formed through a third mask process. The data line 226 is disposed along a second direction crossing the first direction and the data pad 230 is formed at one end of the data line 226. The source electrode 228 extends from the data line 226 and overlaps the semiconductor layer 224. The drain electrode 232 spaced apart from the source electrode 228 also overlaps the semiconductor layer 224. In addition, the first connection electrode 234 extends from the drain electrode 232 along the second direction. The second capacitor electrode 236 extends from the first connection electrode 234 and overlaps the first capacitor electrode 218. The first connection electrode 234 is connected to a pixel electrode through a second connection electrode in a subsequent process.

After the source and drain electrodes 228 and 232 are formed, the impurity-doped amorphous silicon material between the source and drain electrodes 228 and 232 is removed. Accordingly, the intrinsic amorphous silicon material of the semiconductor layer 224 is exposed to constitute a channel region "ch." The semiconductor layer 224 includes an active layer 224a of the intrinsic amorphous silicon material and an ohmic contact layer 224b of the impurity-doped amorphous silicon material. Moreover, the gate electrode 214, the semiconductor layer 224, the source electrode 228 and the drain electrode 232 constitute a thin film transistor (TFT) "T." The second metallic material may be selected from a chemically resistive material such as molybdenum (Mo), titanium (Ti), tungsten (W) and chromium (Cr). Specifically, the second metallic material excludes aluminum (Al).

In FIGS. 7D, 8D, 9D and 10D, after a first passivation layer 225 is formed on the TFT "T," a light shielding resin is coated on the first passivation layer 225. For example, the resin may have a resistivity higher than about $10^{10}$ Ωcm and a dielectric constant lower than about 20. The resin may include carbon particles for shielding light. Next, a black matrix 231 is formed through a forth mask process. The black matrix 231 has an open portion 227 corresponding to a pixel region "P" defined by the gate line 212 and the data line 226. Accordingly, the black matrix 231 is disposed in a region excluding the pixel region "P." The first passivation layer 225 may be formed of silicon insulating material such as silicon nitride (SiNx) and silicon oxide ($SiO_2$).

The resin may include carbon particles for shielding light. When the resin includes carbon particles, the carbon particles may be coated with an insulating material to prevent signal delay due to the carbon particles. In addition, the resin may include color pigments. The black matrix 231 covers the channel region "ch" of the TFT "T" to shield ambient light. Accordingly, the ambient light is not irradiated onto the channel region "ch" and generation of a photocurrent in the channel region "ch" is prevented. In addition, the black matrix 231 is not disposed over the gate pad 216, the common pad 220 and the data pad 230 for connection with an external circuit.

In FIGS. 7E, 8E, 9E and 10E, after a second passivation layer 233 is formed on the black matrix 231, a drain contact hole 235, a gate pad contact hole 237, a common pad contact hole 239 and a data pad contact hole 238 are formed through a fifth mask process. The drain contact hole 235 is formed through the second and first passivation layers 233 and 225 and exposes the drain electrode 232 in the open portion 227. The gate pad contact hole 237 is formed through the second passivation layer 233, the first passivation layer 225 and the gate insulating layer 222 and exposes the gate pad 216. The common pad contact hole 239 is formed through the second passivation layer 233, the first passivation layer 225 and the gate insulating layer 222 and exposes the common pad 220. In addition, the data pad contact hole 238 is formed through the second passivation layer 233 and the first passivation layer 225 and exposes the data pad 230. The second passivation layer 233 may be formed of the same material as the first passivation layer 225.

In FIGS. 7F, 8F, 9F and 10F, after a third metallic material is deposited on the second passivation layer 233, a second connection electrode 240, an auxiliary gate pad terminal 242 and a common line 244 are formed through a sixth mask process. The second connection electrode 240 is connected to the drain electrode 232 through the drain contact hole 235 and the auxiliary gate pad terminal 242 is connected to the gate pad 216 through the gate pad contact hole 237. In addition, the common line 244 is connected to the common pad 220 through the common pad contact hole 239 and is formed along the first direction to overlap the gate line 212. The third metallic material may be selected from a material preventing a galvanic phenomenon between an Al pattern and an ITO pattern. For example, the third metallic material may be selected from a chemically resistive material such as molybdenum (Mo), titanium (Ti), tungsten (W) and chromium (Cr) and may exclude aluminum (Al). The second connection electrode 240 may have an island shape as an independent pattern. Specifically, the second connection electrode 240 is disposed over the TFT "T." Since the second connection electrode 240 connects the TFT "T" to a pixel electrode 256 through a color filter layer 246 in a subsequent process, the second connection electrode 240 may extend beyond the open portion 227 on the basis of an area for the color filter layer 246.

In FIGS. 7G, 8G, 9G and 10G, after a red color resin is coated on the second connection electrode 240, a red sub-color filter 246a is formed in the open portion 227 through a seventh mask process. Similarly, green and blue sub-color filters 246b and 246c are sequentially formed through eighth and ninth mask processes, thereby a color filter layer 246 including the red, green and blue sub-color filters 246a, 246b and 246c are completed.

In FIGS. 7H, 8H, 9H and 10H, after a transparent conductive material is deposited on the color filter layer 246, a pixel connection line 254, a common connection line 258, a plurality of pixel electrodes 256 and a plurality of common electrodes 260 are formed through a tenth mask process. The pixel connection line 254 directly contacts the second connection electrode 240 and the plurality of pixel electrodes 256 extend from the pixel connection line 254 along the second direction. The common connection line 258 directly contacts the common line 244 and the plurality of common electrodes 260 extend from the common connection line 258 along the second direction. The plurality of pixel electrodes 256 alternate with the plurality of common electrodes 260.

At least one common electrode 260 overlaps the data line 226 and the black matrix 231 of a resin is interposed between the at least one common electrode 260 and the data line 226 without an additional organic insulating layer. Since the resin for the black matrix 231 has a relatively high resistivity and a relatively low dielectric constant, an electric interference between the at least one common electrode 260 and the data line 226 can be prevented and a signal delay due to a capacitance between the at least one common electrode 260 and the data line 226 can be minimized. In addition, since a space between the at least one common electrode 260 and the adjacent pixel electrode 256 is used as a display area, an aperture ratio is improved. Moreover, since a space between the common line 244 and the gate line 212 is also used as a display area, the aperture ratio is further improved.

At the same time, a gate pad terminal 262, a data pad terminal 264 and a common pad terminal 263 are formed through the tenth mask process. The gate pad terminal 262 contacts the auxiliary gate pad terminal 242. The data pad terminal 264 is connected to the data pad 230 through the data pad contact hole 238 and the common pad terminal 263 is connected to the common line 244 through the common pad contact hole 239. Since the gate pad terminal 262 is connected to gate pad 216 through the auxiliary gate pad terminal 242 interposed therebetween, a corrosion by a galvanic phenomenon between the gate pad terminal 262 including ITO or IZO and the gate pad 216 including Al is prevented. In addition, since the auxiliary gate pad terminal 242 is formed through the same process as the common line 244, an additional process for the auxiliary gate pad terminal 242 is not required.

Figure 11:
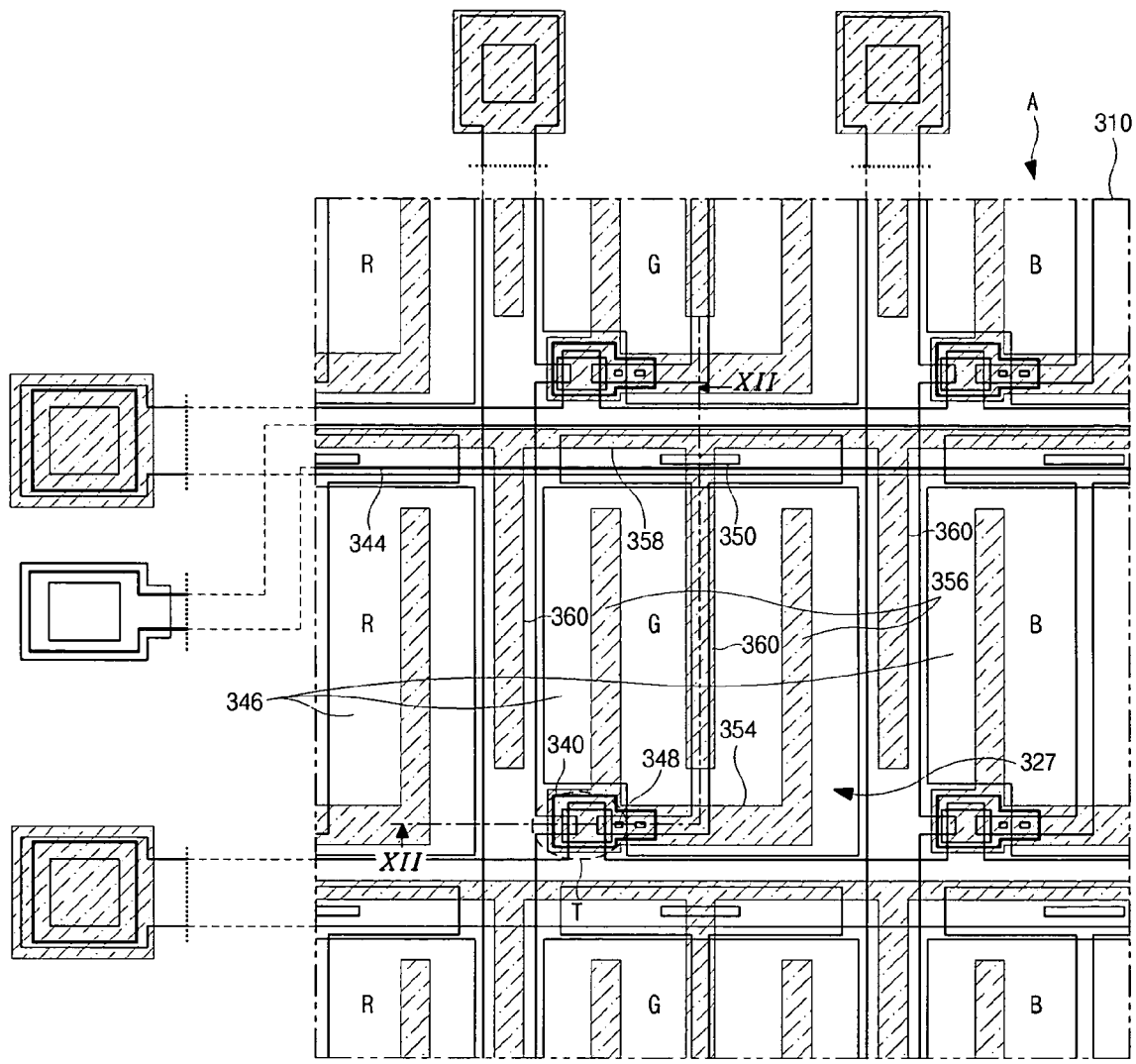
FIG. 11 is a schematic plane view showing a substrate for an in-plane switching mode color filter in a thin film transistor type liquid crystal display device according to an embodiment of the present invention.
Figure 12:
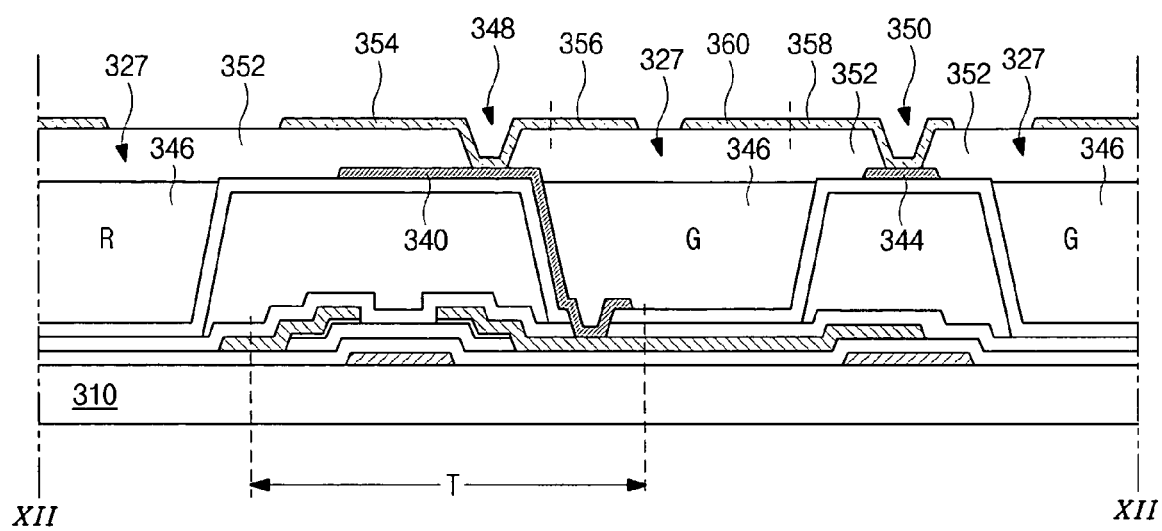
FIG. 12 is a schematic cross-sectional view taken along a line "XII—XII" of FIG. 11.
Figure 13A:
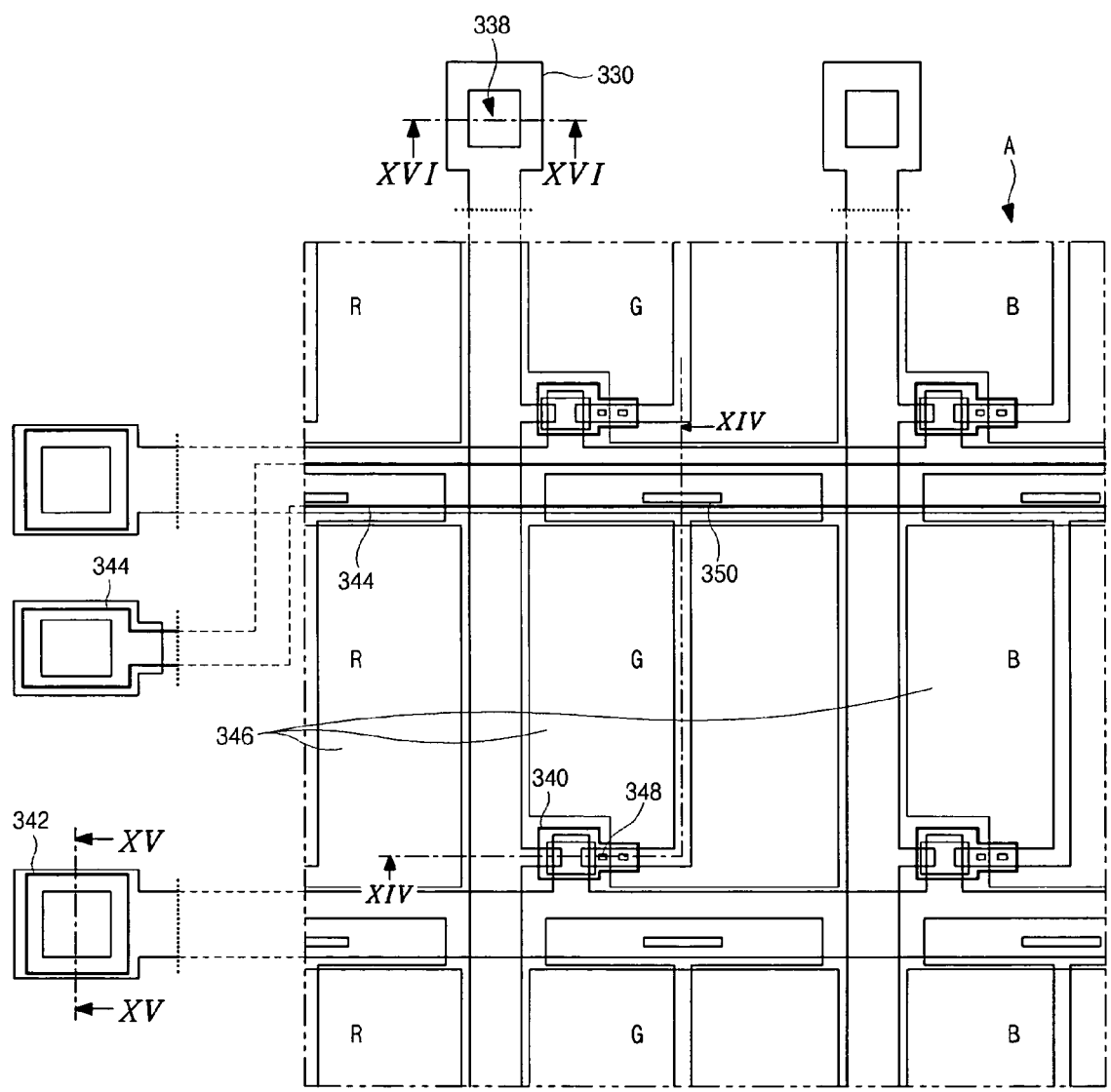
FIGS. 13A and 13B are schematic cross-sectional views showing a fabricating process of a substrate for an in-plane switching mode color filter in a thin film transistor type liquid crystal display device according to an embodiment of the present invention.
Figure 13B:
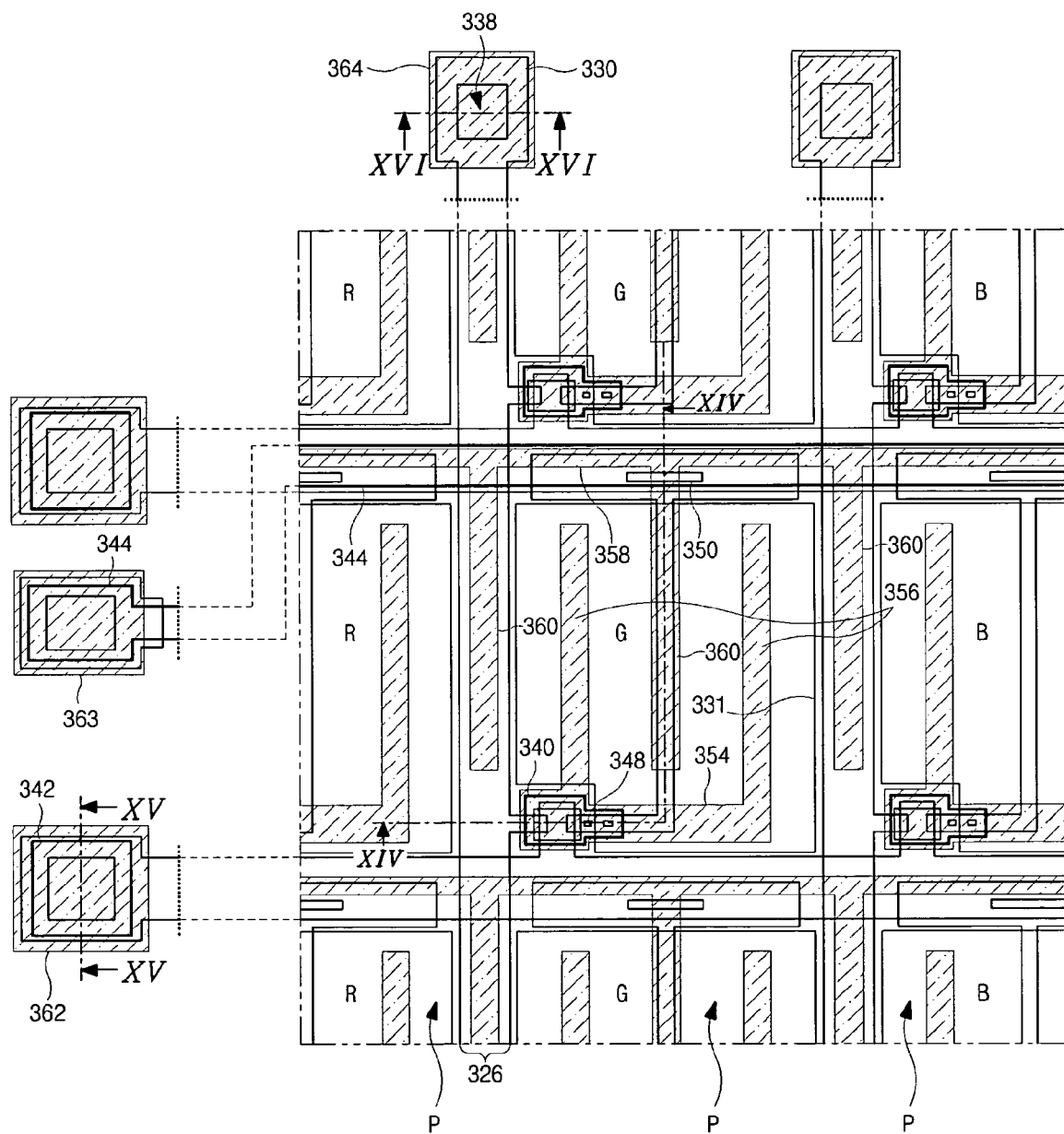

FIG. 11 is a schematic plane view showing a substrate for an in-plane switching mode color filter on thin film transistor type liquid crystal display device according to an embodiment of the present invention and FIG. 12 is a schematic cross-sectional view taken along a line "XII—XII" of FIG. 11. Illustrations for the like portions described in previous figures will be omitted.

In FIGS. 11 and 12, a third passivation layer 352 is formed on a color filter layer 346 in an active region "A" for displaying images. The third passivation layer 352 has a first contact hole 348 exposing a second connection electrode 340 over a thin film transistor (TFT) "T" and a second contact hole 350 exposing a common line 344. The third passivation layer 352 may be formed of an organic insulating material for planarization. For example, one of photoacrylate and benzocyclobutene (BCB) may be used as the organic insulating material. A pixel connection line 354, a plurality of pixel electrodes 356, a common connection line 358 and a plurality of common electrodes 360 are formed on the third passivation layer 352. Uncovered region 327 is a portion of the third passivation layer 352 not covered by the pixel connection line 354, a plurality of pixel electrodes 356, a common connection line 358, and a plurality of common electrodes 360. The pixel connection line 354 is connected to the second connection electrode 340 through the first contact hole 348 and the plurality of pixel electrodes 356 extend from the pixel connection line 354. The common connection line 358 is connected to the common line 344 through the second contact hole 350 and the plurality of common electrodes 356 extend from the common connection line 358. The plurality of pixel electrodes 356 alternate with the plurality of common electrodes 360.

Figure 14A:
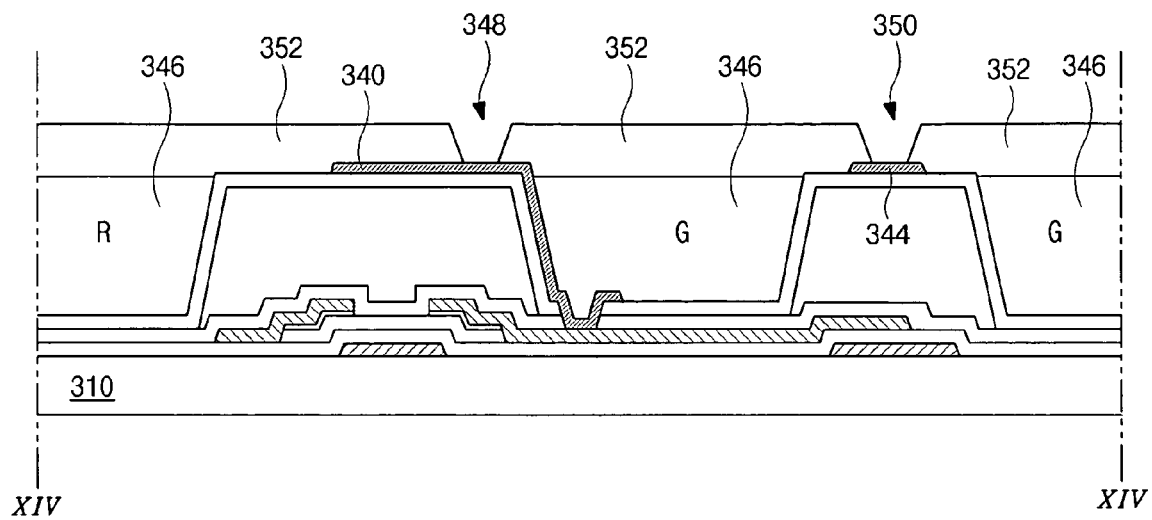
FIGS. 14A and 14B are schematic cross-sectional views, which are taken along a line "XIV—XIV" of FIGS. 13A and 13B, showing a fabricating process of a substrate for an in-plane switching mode color filter in a thin film transistor type liquid crystal display device according to an embodiment of the present invention.
Figure 14B:
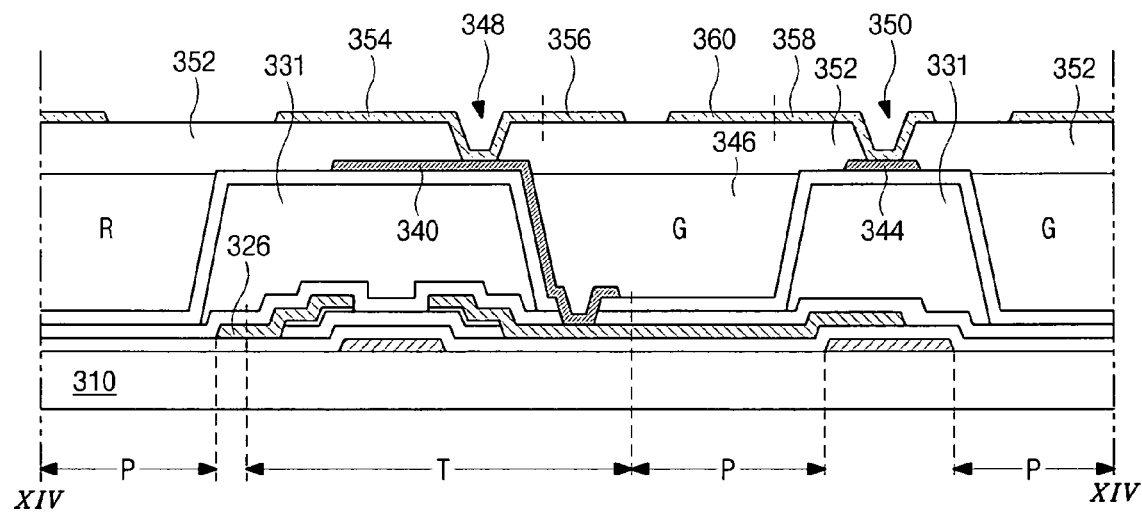
Figure 15A:
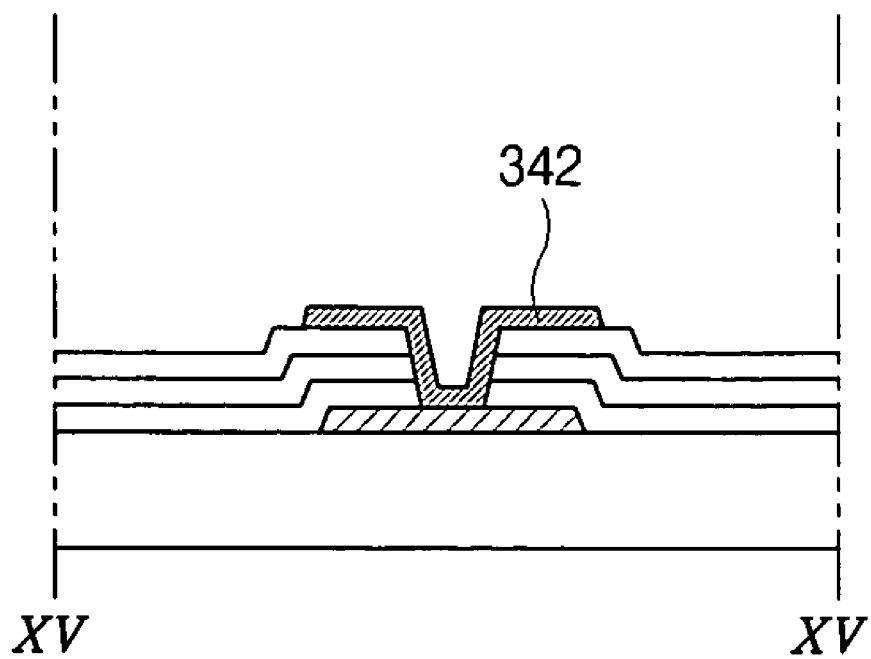
FIGS. 15A and 15B are schematic cross-sectional views, which are taken along a line "XV—XV" of FIGS. 13A and 13B, showing a fabricating process of a substrate for an in-plane switching mode color filter in a thin film transistor type liquid crystal display device according to an embodiment of the present invention.
Figure 15B:
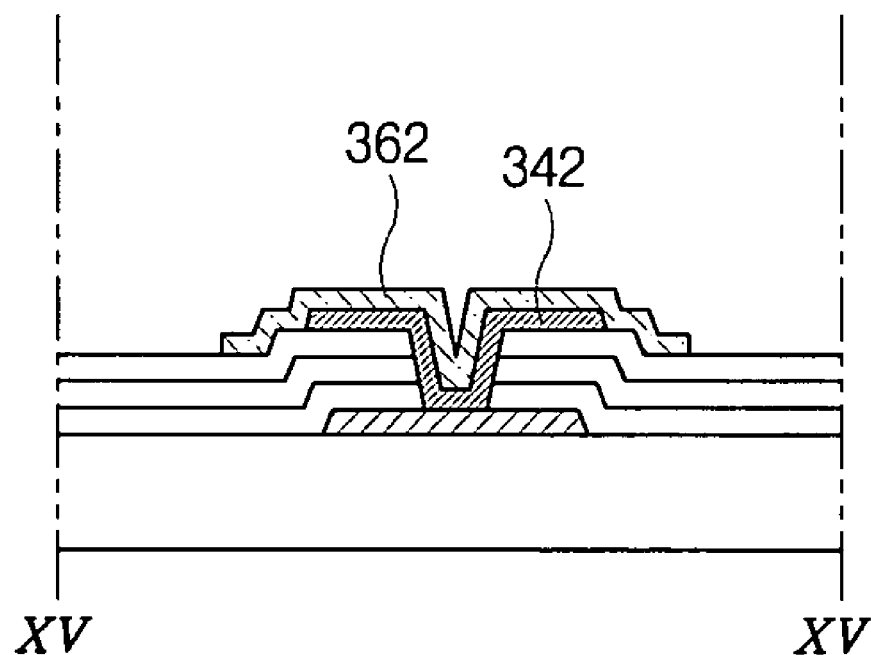
Figure 16A:
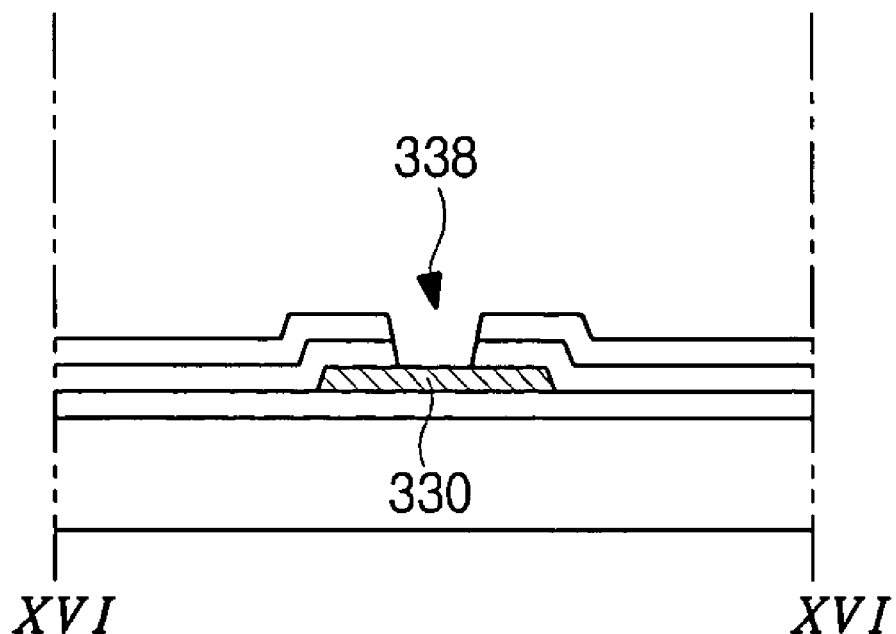
FIGS. 16A and 16B are schematic cross-sectional views, which are taken along a line "XVI—XVI" of FIGS. 13A and 13B, showing a fabricating process of a substrate for an in-plane switching mode color filter in a thin film transistor type liquid crystal display device according to an embodiment of the present invention.
Figure 16B:
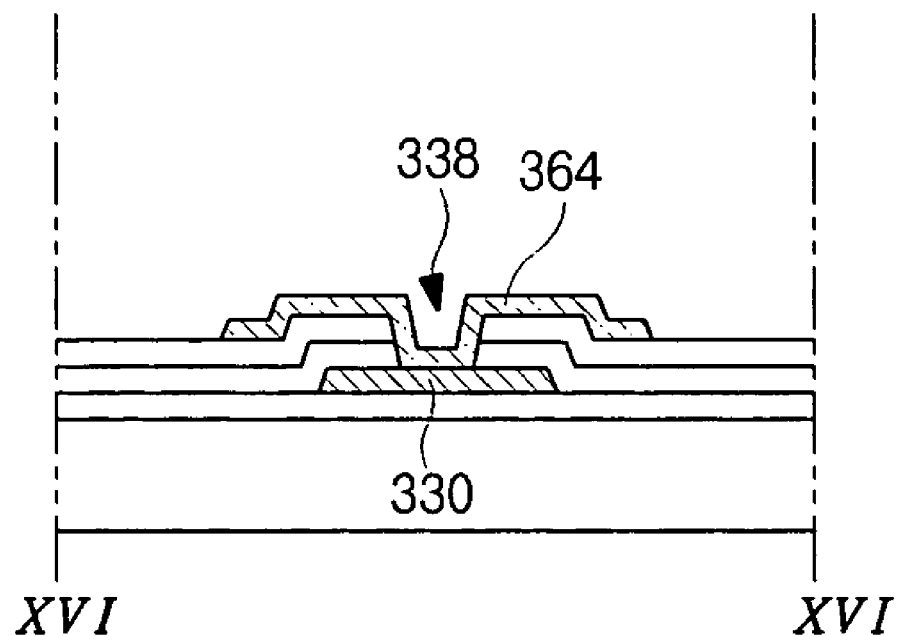

FIGS. 13A and 13B, 14A and 14B, 15A and 15B, and 16A and 16B are schematic cross-sectional views showing a fabricating process of a substrate for an in-plane switching mode color filter on thin film transistor type liquid crystal display device according to an embodiment of the present invention. FIGS. 14A and 14B are taken along a line "XIV—XIV" of FIGS. 13A and 13B, FIGS. 15A and 15B are taken along a line "XV—XV" of FIGS. 13A and 13B, and FIGS. 16A and 16B are taken along a line "XVI-XVI" of FIGS. 13A and 13B. Illustrations and drawings for the same processes described in reference to previous figures will be omitted.

In FIGS. 13A, 14A, 15A and 16A, a third passivation layer 352 having a first contact hole 348 and a second contact hole 350 is formed on a color filter layer 346 in an active region "A" for displaying images. The first and second contact holes 348 and 350 expose a second connection electrode 340 and a common line 344, respectively. The third passivation layer 352 may be formed of an organic insulating material such as photoacrylate and benzocyclobutene (BCB) for planarization. Since the third passivation layer 352 is formed in the active region "A," an auxiliary gate pad terminal 342, a data pad 330 and a common line 344 in a peripheral region of the active region "A" are exposed.

In FIGS. 13B, 14B, 15B and 16B, a pixel connection line 354, a plurality of pixel electrodes 356, a common connection line 358 and a plurality of common electrodes 360 are formed on the third passivation layer 352. The pixel connection line 354 is connected to the second connection electrode 340 through the first contact hole 348 and the plurality of pixel electrodes 356 extend from the pixel connection line 354 along a second direction. The common connection line 358 is connected to the common line 344 through the second contact hole 350 and the plurality of common electrodes 360 extend from the common connection line 358 along the second direction. The plurality of pixel electrodes 356 alternate with the plurality of common electrodes 360.

At least one common electrode 360 overlaps the data line 326 and a black matrix 331 of a resin is interposed between the at least one common electrode 360 and the data line 326 without an additional organic insulating layer. Since the resin for the black matrix 331 has a relatively high resistivity and a relatively low dielectric constant, an electric interference between the at least one common electrode 360 and the data line 326 can be prevented and a signal delay caused by a capacitance between the at least one common electrode 360 and the data line 326 can be minimized. In addition, since a space between the at least one common electrode 360 and the adjacent pixel electrode 356 is used as a display area, an aperture ratio is improved. Even though the at least one common electrode 360 overlapping the data line 326 is separated from a common electrode in adjacent upper and lower pixel regions, the at least one common electrode 360 may be formed as one body over the adjacent upper and lower pixel regions.

At the same time, a gate pad terminal 362, a data pad terminal 364 and a common pad terminal 363 are formed through the tenth mask process. The gate pad terminal 362 contacts the auxiliary gate pad terminal 342. The data pad terminal 364 is connected to the data pad 330 through the data pad contact hole 338 and the common pad terminal 363 is connected to the common line 344. Since the gate pad terminal 362 is connected to gate pad 316 through the auxiliary gate pad terminal 342 interposed therebetween, a corrosion by a galvanic phenomenon between the gate pad terminal 362 including ITO or IZO and the gate pad 316 including Al is prevented. In addition, since the auxiliary gate pad terminal 342 is formed through the same process as the common line 344, an additional process for the auxiliary gate pad terminal 342 is not required.

Figure 17:
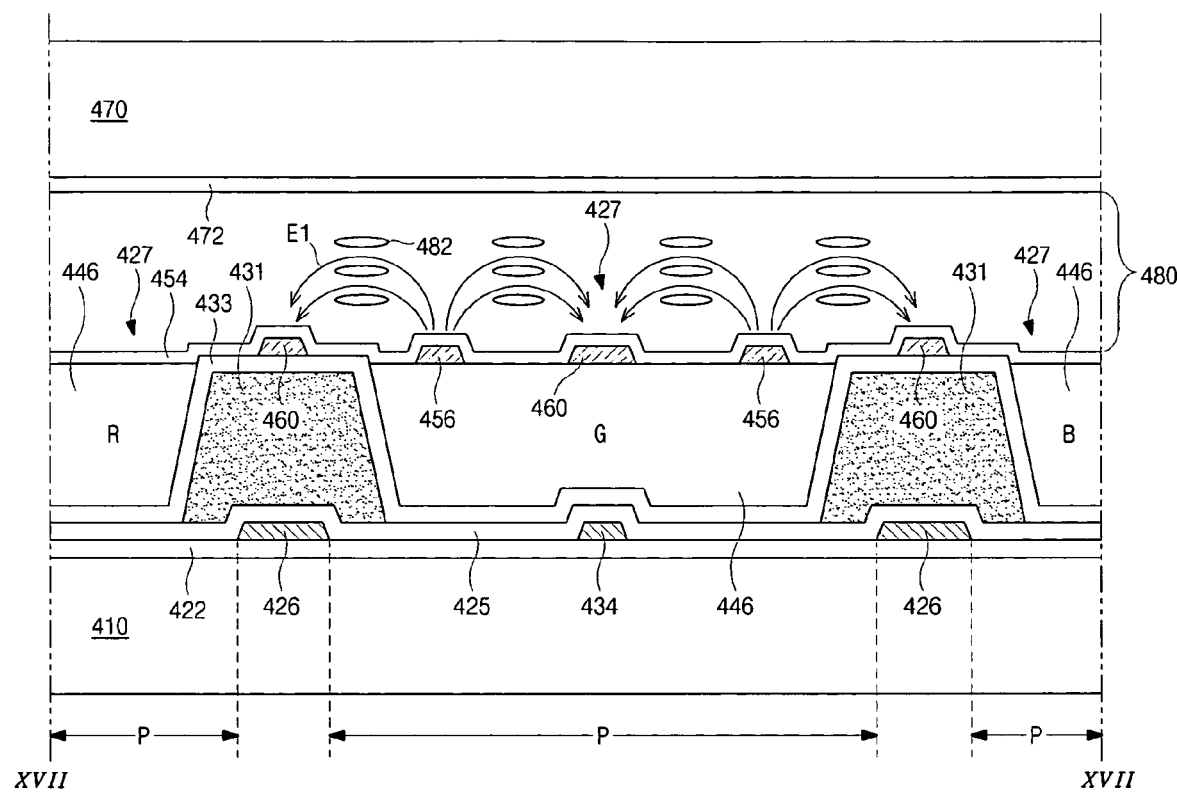
FIG. 17 is a schematic cross-sectional view, which are taken along a line "XVII—XVII" of FIG. 5, showing an in-plane switching mode color filter in a thin film transistor type liquid crystal display device according to an embodiment of the present invention.

FIG. 17 is a schematic cross-sectional view showing an in-plane switching mode color filter on thin film transistor type liquid crystal display device according to an embodiment of the present invention. FIG. 17 may be taken along a line "XVII—XVII" of FIG. 5.

In FIG. 17, first and second substrates 410 and 470 face and are spaced apart from each other. A gate insulating layer 422 is formed on an inner surface of the first substrate 410 and a data line 426 is formed on the gate insulating layer 422. In addition, a first connection electrode 434 is formed between the adjacent data lines 426 on the gate insulating layer 422. A first passivation layer 425 is formed on the data line 426 and the first connection electrode 434, and a black matrix 431 is formed on the first passivation layer 425 over the data line 426. The black matrix 431 has an open portion 427 corresponding to a pixel region "P." A second passivation layer 433 is formed on the black matrix 431 and a color filter layer 446 is formed on the second passivation layer 433 corresponding to the open portion 427. A plurality of common electrodes 460 and a plurality of pixel electrodes 456 are formed on the color filter layer 446. The plurality of common electrodes 460 alternate with the plurality of pixel electrodes 456. Specifically, at least one common electrode 460 adjacent to a boundary portion of the pixel region "P" overlaps the data line 426 with the black matrix 431 interposed therebetween. A first orientation film 454 is formed on the plurality of common electrodes 460 and the plurality of pixel electrodes 456.

A second orientation film 472 is formed on an inner surface of the second substrate 470. A liquid crystal layer 480 is formed between the first and second orientation films 454 and 472. When a voltage is applied to the plurality of common electrodes 460 and the plurality of pixel electrodes 456, a lateral electric field "E1" is generated and liquid crystal molecules 482 is driven by the lateral electric field "E1." Accordingly, a viewing angle is improved. Moreover, since the at least one common electrode 460 overlaps the data line 426, an aperture ratio is also improved.

In an LCD device according to the present invention, since a color filter layer and a black matrix are formed on a single substrate having a thin film transistor, light leakage is effectively prevented. In addition, since a pixel electrode and a common electrode are formed on a single substrate, liquid crystal molecules are driven by a lateral electric field and a viewing angle is improved. Moreover, since a gate pad including aluminum (Al) is connected to a gate pad terminal including one of indium-tin-oxide (ITO) and indium-zinc-oxide (IZO) through an auxiliary gate pad terminal excluding aluminum (Al), corrosion by a galvanic phenomenon is prevented. Further, at least one common electrode overlaps a data line and a common line overlaps a gate line with a black matrix having a relatively high resistivity and a relatively low dielectric constant interposed therebetween. Accordingly, aperture ratio is improved.

It will be apparent to those skilled in the art that various modifications and variations can be made in the LCD device and manufacturing method thereof of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   first and second substrates facing and spaced apart from each other;
   a gate line on an inner surface of the first substrate;
   a data line crossing the gate line to define a pixel region;
   a thin film transistor connected to the gate line and the data line;
   a black matrix over the thin film transistor, the black matrix having an open portion corresponding to the pixel region and including a light shielding resin;
   a connection electrode over the black matrix, the connection electrode being connected to the thin film transistor;
   a color filter layer on the connection electrode, the color filter layer corresponding to the open portion;
   a plurality of pixel electrodes on the color filter layer, the plurality of pixel electrodes being connected to the connection electrode;
   a plurality of common electrodes on the color filter layer, the plurality of common electrodes being connected to a common line and alternating with the plurality of pixel electrodes; and
   a liquid crystal layer between the first and second substrates.

2. The device of claim 1, wherein the thin film transistor includes a gate electrode, a semiconductor layer, a source electrode and a drain electrode, wherein the connection electrode is connected to the drain electrode and includes an opaque metallic material excluding aluminum.

3. The device of claim 1, wherein the connection electrode includes the same material as the common line.

4. The device of claim 1, wherein the color filter layer includes red, green and blue sub-color filters alternately disposed in each pixel region.

5. The device of claim 1, further comprising a pixel connection line connected to the connection electrode, the plurality of pixel electrodes extending from the pixel connection line.

6. The device of claim 1, further comprising a common connection line connected to the common line, the plurality of common electrodes extending from the common connection line.

7. The device of claim 1, wherein the liquid crystal layer is driven by a lateral electric field generated between the plurality of pixel electrodes and the plurality of common electrodes.

8. The device of claim 1, wherein the light shielding resin has a resistivity higher than about $10^{10}$ Ωcm and a dielectric constant lower than about 20.

9. The device of claim 1, wherein at least one common electrode overlaps the data line.

10. The device of claim 9, wherein the black matrix is formed between the at least one common electrode and the data line.

11. The device of claim 10, wherein the black matrix is on the gate line.

12. The device of claim 1, further comprising a first passivation layer between the thin film transistor and the black matrix.

13. The device of claim 12, further comprising a second passivation layer between the black matrix and the connection electrode.

14. The device of claim 13, further comprising a third passivation layer between the color filter layer and the plurality of pixel electrodes and between the color filter layer and the plurality of common electrodes.

15. The device of claim 14, wherein the third passivation layer includes an organic insulating material.

16. The device of claim 1, wherein the plurality of common electrodes and the plurality of pixel electrodes include a transparent conductive material.

17. The device of claim 1, further comprising a gate pad at one end of the gate line, a data pad at one end of the data line and a common pad at one end of the common line.

18. The device of claim 17, wherein the common pad has an island shape and includes the same material as the gate line.

19. The device of claim 18, further comprising an auxiliary common pad terminal between the common pad and a common pad terminal.

20. The device of claim 17, wherein the common pad includes the same material as the common line.

21. The device of claim 17, further comprising a gate pad terminal connected to the gate pad, a common pad terminal connected to the common pad and a data pad terminal connected to the data pad, the gate pad terminal, the common pad terminal and the data pad terminal including the same material as the plurality of pixel electrodes and the plurality of common electrodes.

22. The device of claim 21, further comprising an auxiliary gate pad terminal between the gate pad and the gate pad terminal.

23. The device of claim 1, wherein a common line corresponds to the gate line.

24. The device of claim 1, wherein at least one common electrode of the plurality of common electrodes is formed as one body over adjacent upper and lower pixel regions.

25. A method of fabricating liquid crystal display device, comprising:
    forming a gate line and a gate pad at one end of the gate line on a first substrate;
    forming a data line crossing the gate line to define a pixel region and a data pad at one end of the data line;
    forming a thin film transistor connected to the gate line and the data line;
    forming a black matrix over the thin film transistor, the black matrix having an open portion corresponding to the pixel region and including a light shielding resin;
    forming a connection electrode over the black matrix, an auxiliary gate pad terminal contacting the gate pad, the connection electrode being connected to the thin film transistor;
    forming a color filter layer on the connection electrode, the color filter layer corresponding to the open portion;
    forming a pixel connection line connected to the connection electrode, a plurality of pixel electrodes extending from the pixel connection line, a common connection line connected to a common line and a plurality of common electrodes extending from the common connection line on the color filter layer, the plurality of common electrodes alternating with the plurality of pixel electrodes; and
    forming a liquid crystal layer between the first and second substrates.

26. The method of claim 25, wherein the color filter layer includes red, green and blue sub-color filters alternately disposed in each pixel region.

27. The method of claim 25, wherein the resin for the black matrix has a resistivity higher than about $10^{10}$ Ωcm and a dielectric constant lower than about 20.

28. The method of claim 25, wherein at least one common electrode overlaps the data line.

29. The method of claim 28, wherein the black matrix is formed between the at least one common electrode and the data line.

30. The method of claim 25, further comprising forming a first passivation layer between the thin film transistor and the black matrix.

31. The method of claim 30, further comprising forming a second passivation layer between the black matrix and the connection electrode.

32. The method of claim 31, further comprising forming a third passivation layer between the color filter layer and the plurality of pixel electrodes and between the color filter layer and the plurality of common electrodes.

33. The method of claim 32, wherein the third passivation layer includes an organic insulating material.

34. The method of claim 25, wherein forming the gate line and the gate pad includes forming a common pad of an island shape at one end of the common line.

35. The method of claim 34, wherein forming the gate line and the gate pad includes forming an auxiliary common pad terminal between the common pad and a common pad terminal.

36. The method of claim 34, wherein the common pad includes the same material as the common line.

37. The method of claim 25, wherein the plurality of common electrodes and the plurality of pixel electrodes include a transparent conductive material.

38. The method of claim 25, wherein the thin film transistor includes a gate electrode, a semiconductor layer, a source electrode and a drain electrode, wherein the connection electrode is connected to the drain electrode and includes an opaque metallic material excluding aluminum.

39. The method of claim 38, further comprising forming a capacitor electrode corresponding to a portion of the gate line, the capacitor electrode extending from the drain electrode.

40. The method of claim 39, further comprising forming a gate insulating layer between the portion of the gate line and the capacitor electrode to constitute a storage capacitor.

41. The method of claim 25, further comprising forming a common line corresponding to the gate line.

42. The method of claim 25, wherein forming a plurality of common electrodes extending from the common connection line includes forming at least one common electrode of the plurality of common electrodes as one body over adjacent upper and lower pixel regions.

43. A liquid crystal display device, comprising:
first and second substrates facing and spaced apart from each other;
a gate line on an inner surface of the first substrate;
a data line crossing the gate line to define a pixel region;
a thin film transistor connected to the gate line and the data line;
a black matrix covering the gate line, the data line and the thin film transistor, the black matrix including an opaque resin;
a connection electrode over the black matrix, the connection electrode being connected to the thin film transistor;
a common line overlapping the gate line;
a color filter layer on the connection electrode, the color filter layer corresponding to the pixel region;
a plurality of pixel electrodes on the color filter layer, the plurality of pixel electrodes being connected to the connection electrode;
a plurality of common electrodes on the color filter layer, the plurality of common electrodes being connected to the common line and alternating with the plurality of pixel electrodes; and
a liquid crystal layer between the first and second substrates.

44. The device of claim 43, wherein at least one common electrode overlaps the data line.

* * * * *